United States Patent
Chong et al.

(10) Patent No.: US 11,757,748 B2
(45) Date of Patent: Sep. 12, 2023

(54) POLICY DETERMINING METHOD, SYSTEM, AND APPARATUS

(71) Applicant: HUAWEI TECHNOLOGIES CO., LTD., Guangdong (CN)

(72) Inventors: Weiwei Chong, Shenzhen (CN); Yang Xin, Shanghai (CN); Xiaobo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/744,256

(22) Filed: May 13, 2022

(65) Prior Publication Data

US 2022/0272018 A1    Aug. 25, 2022

Related U.S. Application Data

(63) Continuation of application No. PCT/CN2019/118920, filed on Nov. 15, 2019.

(51) Int. Cl.
*H04L 29/08* (2006.01)
*H04L 67/14* (2022.01)
*H04L 12/851* (2013.01)
*H04L 43/091* (2022.01)
*H04L 43/20* (2022.01)
(Continued)

(52) U.S. Cl.
CPC ........... *H04L 43/091* (2022.05); *H04L 43/10* (2013.01); *H04L 43/20* (2022.05)

(58) Field of Classification Search
CPC ....... H04L 43/091; H04L 43/20; H04L 43/10; H04L 29/08; H04L 67/14; H04L 28/02; H04L 12/851
(Continued)

(56) References Cited

U.S. PATENT DOCUMENTS

| 10,637,753 B1 * | 4/2020 | Taft | H04L 43/04 |
| 2018/0262924 A1 * | 9/2018 | Dao | H04W 24/02 |

(Continued)

FOREIGN PATENT DOCUMENTS

| CN | 104937983 A | 9/2015 |
| CN | 104937995 A | 9/2015 |

(Continued)

OTHER PUBLICATIONS

3GPP TS 23.288 V0.4.0, "3rd Generation Partnership Project; Technical Specification Group Services and System Aspects; Architecture enhancements for 5G System (5GS) to support network data analytics services (Release 16)", Apr. 24, 2019, pp. 1-48, XP051723683.

(Continued)

*Primary Examiner* — Jude Jean Gilles
(74) *Attorney, Agent, or Firm* — HUAWEI TECHNOLOGIES CO., LTD.

(57) ABSTRACT

This application provides a policy determining method. The method includes: A first network element obtains first analytics information from a data analytics network element, where the first analytics information includes at least one of the following information: radio access type (RAT) related information or access frequency related information, and service experience analytics information corresponding to a RAT or an access frequency; and the first network element determines an access information selection policy of a terminal device based on the first analytics information, where the access information selection policy includes a target RAT or a target access frequency corresponding to the terminal device. The data analytics network element generates analytics information based on obtained network data and service data, and provides the analytics information for a network function network element.

20 Claims, 9 Drawing Sheets

(51) Int. Cl.
 *H04L 43/10* (2022.01)
 *H04W 72/08* (2009.01)
 *H04W 28/24* (2009.01)
 *H04W 76/12* (2018.01)

(58) Field of Classification Search
 USPC .......................................................... 709/224
 See application file for complete search history.

(56) References Cited

U.S. PATENT DOCUMENTS

2019/0222489 A1  7/2019  Shan
2019/0394279 A1* 12/2019  Dao ..................... H04W 48/04

FOREIGN PATENT DOCUMENTS

| CN | 106464525 A | 2/2017 |
| CN | 106465242 A | 2/2017 |
| CN | 106605430 A | 4/2017 |
| RU | 2660624 C2 | 7/2018 |
| RU | 2697933 C1 | 8/2019 |
| WO | 2019032968 A1 | 2/2019 |
| WO | 2019158777 A1 | 8/2019 |

OTHER PUBLICATIONS

Huawei, HiSilicon, Policy on RAT/Frequency Selection Priority. SA WG2 Meeting #117, Oct. 17-21, 2016, Kaohsiung City, Taiwan, S2-165878, 8 pages.

* cited by examiner

POLICY DETERMINING METHOD, SYSTEM, AND APPARATUS

CROSS-REFERENCE TO RELATED APPLICATION

This application is a continuation of International Application No. PCT/CN2019/118920, filed on Nov. 15, 2019. The disclosure of the aforementioned application is hereby incorporated by reference in its entirety.

TECHNICAL FIELD

This application relates to the wireless communication field, and in particular, to a policy determining method, a system, and an apparatus.

BACKGROUND

In a 5G network, there is a network deployment scenario in which access networks of two radio access types (RAT): enhanced long term evolution (eLTE) and new radio (NR) coexist, and there may be a plurality of access frequencies (for example, 2.6 GHz, 3.5 GHz, 700 MHz, and 900 MHz) for each RAT.

In a conventional technology, a radio access network (RAN) generally uses a RAT or an access frequency with a current highest priority as a target RAT or access frequency and sends the target RAT or access frequency to a terminal device, so that after entering an idle mode, the terminal device can subsequently access the target RAT or the target access frequency based on the information sent by the RAN. Consequently, a method for accessing the access network by the terminal device is not flexible enough.

SUMMARY

This application provides a policy determining method, a system, and an apparatus, to improve flexibility of accessing an access network.

According to a first aspect, a policy determining method is provided. The method includes: A first network element obtains first analytics information from a data analytics network element, where the first analytics information includes at least one of the following information: radio access type RAT related information or access frequency related information, and service experience analytics information corresponding to a RAT or an access frequency; and the first network element determines an access information selection policy of a terminal device based on the first analytics information, where the access information selection policy includes a target RAT or a target access frequency corresponding to the terminal device.

Optionally, the service experience analytics information corresponding to the RAT or the access frequency is used to indicate service experience corresponding to a service type in the RAT or the access frequency.

According to this embodiment of this application, the data analytics network element generates analytics information based on obtained network data and service data, and provides the analytics information for a network function network element. The network function network element allocates a dynamically variable RAT or access frequency to the terminal device based on the analytics information, to meet a service experience requirement of the terminal device, thereby increasing flexibility of accessing an access network.

With reference to the first aspect, in some implementations of the first aspect, the RAT related information or the access frequency related information includes at least one of the following information: an identifier, a service type, a recommended RAT or a recommended access frequency, time information, and area information of the terminal device.

According to this embodiment of this application, the first network element may determine the access information selection policy of the terminal device based on at least one of the foregoing information, to provide an access solution for the terminal device.

With reference to the first aspect, in some implementations of the first aspect, the service experience analytics information corresponding to the RAT or the access frequency includes at least one of the following information: the identifier, the service type, the RAT or the access frequency, service experience for the service type, the time information, and the area information of the terminal device.

According to this embodiment of this application, the first network element may determine the access information selection policy of the terminal device based on at least one of the foregoing information, to provide an access solution for the terminal device.

With reference to the first aspect, in some implementations of the first aspect, that the first network element determines an access information selection policy of a terminal device based on the first analytics information includes: The first network element determines, based on the first analytics information, the target RAT or the target access frequency corresponding to the terminal device, where service experience for the service type of the terminal device in the target RAT or the target access frequency meets a preset condition.

With reference to the first aspect, in some implementations of the first aspect, when the first analytics information is the RAT related information or the access frequency related information, and the RAT related information or the access frequency related information includes the recommended RAT or the recommended access frequency for the terminal device, that the first network element determines an access information selection policy of a terminal device based on the first analytics information includes: The first network element determines the recommended RAT or the recommended access frequency for the terminal device as the target RAT or the target access frequency corresponding to the terminal device.

With reference to the first aspect, in some implementations of the first aspect, when the first analytics information is the RAT related information or the access frequency related information, and the RAT related information or the access frequency related information includes the recommended RAT or the recommended access frequency for at least one service type, that the first network element determines an access information selection policy of a terminal device based on the first analytics information includes: The first network element determines a service type that has been initiated or is to be initiated by the terminal device; and the first network element determines a recommended RAT or a recommended access frequency corresponding to the service type that has been initiated or is to be initiated by the terminal device as the target RAT or the target access frequency corresponding to the terminal device.

With reference to the first aspect, in some implementations of the first aspect, when the first analytics information is the RAT information or the access frequency information, and the RAT related information or the access frequency related information includes the recommended RAT or the recommended access frequency for at least one service type of the terminal device, that the first network element determines an access information selection policy of a terminal device based on the first analytics information includes: The first network element determines a service type that has been initiated or is to be initiated by the terminal device; and the first network element determines a recommended RAT or a recommended access frequency corresponding to the service type that has been initiated or is to be initiated by the terminal device as the target RAT or the target access frequency corresponding to the terminal device.

With reference to the first aspect, in some implementations of the first aspect, when the first analytics information is the service experience analytics information corresponding to the RAT or the access frequency, and the service experience analytics information corresponding to the RAT or the access frequency includes corresponding service experience for at least one service type in the RAT or the access frequency, that the first network element determines an access information selection policy of a terminal device based on the first analytics information includes: The first network element determines a service type that has been initiated or is to be initiated by the terminal device; and for the service type that has been initiated or is to be initiated by the terminal device, the first network element determines the target RAT or the target access frequency in the service experience analytics information corresponding to the RAT or the access frequency, where corresponding service experience for the service type that is in the target RAT or the target access frequency and that has been initiated or is to be initiated by the terminal device meets the preset condition.

With reference to the first aspect, in some implementations of the first aspect, when the first analytics information is the service experience analytics information corresponding to the RAT or the access frequency, and the service experience analytics information corresponding to the RAT or the access frequency includes corresponding service experience for at least one service type of the terminal device in the RAT or the access frequency, that the first network element determines an access information selection policy of a terminal device based on the first analytics information includes: The first network element determines a service type that has been initiated or is to be initiated by the terminal device; and for the service type that has been initiated or is to be initiated by the terminal device, the first network element determines the target RAT or the target access frequency in the service experience analytics information corresponding to the RAT or the access frequency, so that corresponding service experience for the service type that is in the target RAT or the target access frequency and that has been initiated or is to be initiated by the terminal device can meet the preset condition.

According to this embodiment of this application, the first network element may determine the target RAT or the target access frequency based on the first analytics information. The service experience of the terminal device can meet the preset condition with the target RAT or the target access frequency used. For example, an MOS of a voice service of the terminal device can exceed 3 scores with eLTE/700 MHz used. In this case, eLTE/700 MHz is used as a target RAT or a target access frequency corresponding to the terminal device when the terminal device initiates the voice service. For another example, it is recommended that a voice service of the terminal device access eLTE/700 MHz. In this case, eLTE/700 MHz is used as a target RAT or a target access frequency corresponding to the terminal device when the terminal device initiates the voice service.

With reference to the first aspect, in some implementations of the first aspect, that the first network element determines a service type that is to be initiated by the terminal device includes: The first network element obtains service behavior analytics information of the terminal device that is sent by the data analytics network element; and the first network element predicts, based on the service behavior analytics information of the terminal device, the service type that is to be initiated by the terminal device.

According to this embodiment of this application, the data analytics network element may send prediction information for the service behavior analytics information of the terminal device to the first network element, and the first network element may predict, based on the obtained prediction information, the service type that is to be initiated by the terminal device.

With reference to the first aspect, in some implementations of the first aspect, the service behavior analytics information of the terminal device includes service behavior statistics information of the terminal device or service behavior prediction information of the terminal device.

It should be understood that the service behavior analytics information of the terminal device may include the service behavior statistics information of the terminal device or the service behavior prediction information of the terminal device. In other words, the service behavior analytics information may be obtained through big data-based statistical collection, or may be predicted by another terminal that has a same user profile persona classification model as that of the terminal device.

With reference to the first aspect, in some implementations of the first aspect, that a first network element obtains first analytics information from a data analytics network element includes: The first network element sends a first request message to the data analytics network element, where the first request message includes the service type, and the first request message is used to request the first analytics information corresponding to the service type; and the first network element receives a first response message sent by the data analytics network element, where the first response message includes the first analytics information corresponding to the service type.

With reference to the first aspect, in some implementations of the first aspect, that a first network element obtains first analytics information from a data analytics network element includes: The first network element sends a first request message to the data analytics network element, where the first request message includes the identifier of the terminal device, and the first request message is used to request the first analytics information corresponding to the terminal device; and the first network element receives a first response message sent by the data analytics network element, where the first response message includes the first analytics information corresponding to the terminal device.

According to this embodiment of this application, the first network element may send the first request information to the data analytics network element, where the first request information may include the identifier or the service type of the terminal device, and is used to request the corresponding first analytics information.

With reference to the first aspect, in some implementations of the first aspect, the method further includes: The first network element further obtains an applicable condition of the first analytics information, where the applicable condition includes at least one of the following information: the service type, a user type, a user identifier, the time information, and the area information.

According to this embodiment of this application, the first network element may receive the applicable condition of the first analytics information that is sent by the data analytics network element, where the applicable condition is used to indicate a case in which the first network element uses the first analytics information.

With reference to the first aspect, in some implementations of the first aspect, when the first network element is a core network element or a network management network element, the method further includes: The first network element sends the access information selection policy of the terminal device to an access network element; or the first network element sends the access information selection policy of the terminal device to the terminal device.

According to this embodiment of this application, the access network element triggers, with reference to the access information selection policy of the terminal device, the terminal device to access the target RAT or the target access frequency (or another RAT or another frequency), or the terminal device triggers, with reference to the access information selection policy of the terminal device, the terminal device to access the target RAT or the target access frequency (or another RAT or another frequency).

With reference to the first aspect, in some implementations of the first aspect, when the first network element is an access network element, the method further includes: The first network element triggers, with reference to the access information selection policy of the terminal device, the terminal device to access the target RAT or the target access frequency.

According to this embodiment of this application, the target RAT or the target access frequency may alternatively be another RAT or another access frequency.

With reference to the first aspect, in some implementations of the first aspect, the method further includes: The first network element sends an applicable condition of the access information selection policy to the access network element or the terminal device, where the applicable condition includes at least one of the following information: the service type, a user type, a user identifier, the time information, and the area information.

According to this embodiment of this application, the first network element may send the applicable condition of the access information selection policy to the access network element or the terminal device, to indicate a case in which the access network element or the terminal device uses the access information selection policy.

With reference to the first aspect, in some implementations of the first aspect, that the first network element determines an access information selection policy of a terminal device based on the first analytics information includes: The first network element determines the access selection policy based on the first analytics information and first information, where the first information includes at least one of the following information: priority information of the service type, charging policy information of the service type, the user type of the terminal device, load or traffic information of the RAT or the access frequency, mobility mode analytics information of the terminal device, and communication mode analytics information of the terminal device.

According to this embodiment of this application, the first network element may determine the access information selection policy based on the first analytics information and the first information, and perform evaluation from a plurality of aspects.

According to a second aspect, a communication apparatus is provided. The apparatus includes: a first receiving unit, configured to obtain first analytics information from a data analytics network element, where the first analytics information includes at least one of the following information: radio access type RAT related information or access frequency related information, and service experience analytics information corresponding to a RAT or an access frequency; and a first processing unit, configured to determine an access information selection policy of a terminal device based on the first analytics information, where the access information selection policy includes a target RAT or a target access frequency corresponding to the terminal device.

With reference to the second aspect, in some implementations of the second aspect, the RAT related information or the access frequency related information includes at least one of the following information: an identifier, a service type, a recommended RAT or a recommended access frequency, time information, and area information of the terminal device.

With reference to the second aspect, in some implementations of the second aspect, the service experience analytics information corresponding to the RAT or the access frequency includes at least one of the following information: the identifier, the service type, the RAT or the access frequency, service experience for the service type, the time information, and the area information of the terminal device.

With reference to the second aspect, in some implementations of the second aspect, that a first processing unit is configured to determine an access information selection policy of a terminal device based on the first analytics information includes: The first processing unit determines, based on the first analytics information, the target RAT or the target access frequency corresponding to the terminal device, where service experience for the service type of the terminal device in the target RAT or the target access frequency meets a preset condition.

With reference to the second aspect, in some implementations of the second aspect, when the first analytics information is the RAT related information or the access frequency related information, and the RAT related information or the access frequency related information includes the recommended RAT or the recommended access frequency for the terminal device, that a first processing unit is configured to determine an access information selection policy of a terminal device based on the first analytics information includes: The first processing unit determines the recommended RAT or the recommended access frequency for the terminal device as the target RAT or the target access frequency corresponding to the terminal device.

With reference to the second aspect, in some implementations of the second aspect, when the first analytics information is the RAT related information or the access frequency related information, and the RAT related information or the access frequency related information includes the recommended RAT or the recommended access frequency for at least one service type, that a first processing unit is configured to determine an access information selection policy of a terminal device based on the first analytics information includes: The first processing unit determines a service type that has been initiated or is to be initiated by the terminal device; and the first processing unit determines a recommended RAT or a recommended access frequency corresponding to the service type that has been initiated or is to be initiated by the terminal device as the target RAT or the target access frequency corresponding to the terminal device.

With reference to the second aspect, in some implementations of the second aspect, when the first analytics information is the service experience analytics information corresponding to the RAT or the access frequency, and the service experience analytics information corresponding to the RAT or the access frequency includes corresponding service experience for at least one service type in the RAT or the access frequency, that a first processing unit is configured to determine an access information selection policy of a terminal device based on the first analytics information includes: The first processing unit determines a service type that has been initiated or is to be initiated by the terminal device; and for the service type that has been initiated or is to be initiated by the terminal device, the first processing unit determines the target RAT or the target access frequency in the service experience analytics information corresponding to the RAT or the access frequency, where corresponding service experience for the service type that is in the target RAT or the target access frequency and that has been initiated or is to be initiated by the terminal device meets the preset condition.

With reference to the second aspect, in some implementations of the second aspect, that the first processing unit determines a service type that is to be initiated by the terminal device includes: The receiving unit obtains service behavior analytics information of the terminal device that is sent by the data analytics network element; and the first processing unit predicts, based on the service behavior analytics information of the terminal device, the service type that is to be initiated by the terminal device.

With reference to the second aspect, in some implementations of the second aspect, the service behavior analytics information of the terminal device includes service behavior statistics information of the terminal device or service behavior prediction information of the terminal device.

With reference to the second aspect, in some implementations of the second aspect, the communication apparatus further includes: a first sending unit, configured to send a first request message to the data analytics network element, where the first request message includes the service type, and the first request message is used to request the first analytics information corresponding to the service type, where the receiving unit is further configured to receive a first response message sent by the data analytics network element, where the first response message includes the first analytics information corresponding to the service type.

With reference to the second aspect, in some implementations of the second aspect, the communication apparatus further includes: a first sending unit, configured to send a first request message to the data analytics network element, where the first request message includes the identifier of the terminal device, and the first request message is used to request the first analytics information corresponding to the terminal device, where the receiving unit is further configured to receive a first response message sent by the data analytics network element, where the first response message includes the first analytics information corresponding to the terminal device.

With reference to the second aspect, in some implementations of the second aspect, the receiving unit is further configured to obtain an applicable condition of the first analytics information, where the applicable condition includes at least one of the following information: the service type, a user type, a user identifier, the time information, and the area information.

With reference to the second aspect, in some implementations of the second aspect, when the communication apparatus is a core network element or a network management network element, the first sending unit is further configured to send the access information selection policy of the terminal device to an access network element; or the first sending unit is further configured to send the access information selection policy of the terminal device to the terminal device.

With reference to the second aspect, in some implementations of the second aspect, when the communication apparatus is an access network element, the first processing unit is further configured to trigger, with reference to the access information selection policy of the terminal device, the terminal device to access the target RAT or the target access frequency.

With reference to the second aspect, in some implementations of the second aspect, the first sending unit is further configured to send an applicable condition of the access information selection policy to the access network element or the terminal device, where the applicable condition includes at least one of the following information: the service type, a user type, a user identifier, the time information, and the area information.

With reference to the second aspect, in some implementations of the second aspect, that a first processing unit is configured to determine an access information selection policy of a terminal device based on the first analytics information includes: The first processing unit determines the access selection policy based on the first analytics information and first information, where the first information includes at least one of the following information: priority information of the service type, charging policy information of the service type, the user type of the terminal device, load or traffic information of the RAT or the access frequency, mobility mode analytics information of the terminal device, and communication mode analytics information of the terminal device.

According to a third aspect, a communication apparatus is provided. The communication apparatus includes at least one processor. The at least one processor is configured to: be coupled to a memory, and read and execute instructions in the memory, to implement the method according to any one of the first aspect and the implementations of the first aspect.

According to a fourth aspect, a communication system is provided. The network system includes at least one communication apparatus according to any one of the third aspect and the implementations of the third aspect and at least one data analytics network element, and the at least one data analytics network element is configured to interact with the communication apparatus.

According to a fifth aspect, a computer storage medium is provided. The computer storage medium stores computer-executable instructions; and when the computer-executable instructions are invoked by a computer, the computer-executable instructions are used to enable the computer to perform the method according to any one of the first aspect and the implementations of the first aspect.

According to a sixth aspect, a data analytics method is provided. The method includes: A data analytics network element receives a first request message, where the first request message is used to request first analytics information, and the first analytics information includes at least one of the following information: RAT related information or access frequency related information, and service experience analytics information corresponding to a RAT or an access frequency; and the data analytics network element sends a first response message, where the first response message includes the first analytics information.

With reference to the sixth aspect, in some implementations of the sixth aspect, the RAT related information or the access frequency related information includes at least one of the following information: an identifier, a service type, a recommended RAT or a recommended access frequency, time information, and area information of a terminal device.

With reference to the sixth aspect, in some implementations of the sixth aspect, the service experience analytics information corresponding to the RAT or the access frequency includes at least one of the following information: the identifier, the service type, the RAT or the access frequency, service experience for the service type, the time information, and the area information of the terminal device.

With reference to the sixth aspect, in some implementations of the sixth aspect, the method includes: The data analytics network element obtains network data and service data, where the network data includes at least one of the following information: the identifier, the time information, the area information, and the RAT or the access frequency of the terminal device, and the service data includes at least one of the following information: the identifier, the service type, and the service experience of the terminal device; and the data analytics network element determines the first analytics information based on the network data and the service data.

Optionally, the area information may be a cell identifier of the terminal device, and the data analytics network element may obtain the cell identifier from a mobility management network element. The data analytics network element obtains, based on the cell identifier, the RAT or the access frequency corresponding to the cell identifier, or the data analytics network element configures the RAT or the access frequency corresponding to the cell identifier.

With reference to the sixth aspect, in some implementations of the sixth aspect, the first request message includes the service type, and the first request message is used to request the first analytics information corresponding to the service type.

With reference to the sixth aspect, in some implementations of the sixth aspect, the first request message includes the identifier of the terminal device, and the first request message is used to request the first analytics information corresponding to the identifier of the terminal device.

With reference to the sixth aspect, in some implementations of the sixth aspect, the first response message further includes an applicable condition of the first analytics information, where the applicable condition includes the at least one of the following information: the service type, a user type, a user identifier, the time information, and location information.

According to a seventh aspect, a method for determining a service type is provided. The method includes: A data analytics network element receives a third request message, where the third request message is used to request service behavior analytics information, and the service behavior analytics information includes terminal device-level service behavior analytics information or service behavior analytics information of a terminal device that is aggregated in a network area; and the data analytics network element sends a third response message, where the third response message includes the service behavior analytics information.

With reference to the seventh aspect, in some implementations of the seventh aspect, the service behavior analytics information includes at least one of the following information: an identifier, time information, area information, a service type, priority information of the service type, an occurrence probability of the service type, duration of the service type, a user quantity corresponding to the service type, and a user quantity proportion of the service type of the terminal device.

With reference to the seventh aspect, in some implementations of the seventh aspect, the service behavior analytics information includes service behavior statistics information or service behavior prediction information.

With reference to the seventh aspect, in some implementations of the seventh aspect, when the service behavior analytics information is terminal device-level service behavior prediction information, the method further includes: The data analytics network element determines service behavior prediction information of a single terminal device.

With reference to the seventh aspect, in some implementations of the seventh aspect, a method in which the data analytics network element determines service behavior prediction information of a single terminal device includes: The data analytics network element determines user profile persona classification information to which the single terminal device belongs; and the data analytics network element predicts service behavior information of the single terminal device based on the user profile persona classification information to which the single terminal device belongs and service behavior information of a terminal device of a same profile persona type.

With reference to the seventh aspect, in some implementations of the seventh aspect, a method in which the data analytics network element determines user profile persona classification information to which the single terminal device belongs includes: The data analytics network element collects terminal device-level network behavior data, terminal device-level service behavior data, and terminal device-level service attribute data; the data analytics network element determines a user profile persona classification model based on the terminal device-level network behavior data, the terminal device-level service behavior data, and terminal device-level historical service attribute data; and the data analytics network element determines, based on the user profile persona classification model, and network behavior data, service behavior data, and service attribute data of the single terminal device, user profile persona classification information to which the terminal device belongs.

With reference to the seventh aspect, in some implementations of the seventh aspect, the third request message includes the identifier of the terminal device, and the third request message is used to request service behavior analytics information corresponding to the identifier of the terminal device.

With reference to the seventh aspect, in some implementations of the seventh aspect, the third request message includes the service type, and the third request message is used to request service behavior analytics information corresponding to the service type.

With reference to the seventh aspect, in some implementations of the seventh aspect, the third request message includes the area information, and the third request message is used to request service behavior analytics information corresponding to the area information.

With reference to the seventh aspect, in some implementations of the seventh aspect, the third response message further includes an applicable condition of the service behavior analytics information, where the applicable condition includes at least one of the following information: the service type, a user type, a user identifier, the time information, and location information.

According to an eighth aspect, a policy determining method is provided. The method includes: A second network element obtains second analytics information from a data analytics network element, where the second analytics information includes at least one of the following information: RAT related information or access frequency related information, service experience analytics information corresponding to a RAT or an access frequency, and service behavior analytics information; and the second network element determines an energy saving policy of a network area based on the second analytics information.

With reference to the eighth aspect, in some implementations of the eighth aspect, the RAT related information or the access frequency related information includes at least one of the following information: an identifier, a service type, a recommended RAT or a recommended access frequency, time information, and area information of a terminal device.

With reference to the eighth aspect, in some implementations of the eighth aspect, the service experience analytics information corresponding to the RAT or the access frequency includes at least one of the following information: the identifier, the service type, the RAT or the access frequency, service experience for the service type, the time information, and the area information of the terminal device.

With reference to the eighth aspect, in some implementations of the eighth aspect, that the second network element determines an energy saving policy of a network area based on the second analytics information includes: The second network element determines a method for enabling or disabling, power consumption control, or load transfer of an access network network element in the network area based on the second analytics information, where the method enables energy consumption of the network area to meet a preset condition and/or the service experience corresponding to the service type to meet a preset condition.

With reference to the eighth aspect, in some implementations of the eighth aspect, when the second analytics information includes the RAT related information or the access frequency related information, and the RAT related information or the access frequency related information includes the recommended RAT or the recommended access frequency for at least one service type, that the second network element determines an energy saving policy of a network area based on the second analytics information includes: The second network element determines a service type of the network area, where the service type of the network area refers to at least one service type that has been initiated or is to be initiated in the network area; the second network element determines a user quantity or a user quantity proportion of the service type of the network area; and the second network element determines the method for enabling or disabling, power consumption control, or load transfer of the access network network element in the network area based on a recommended RAT or a recommended access frequency corresponding to the service type of the network area and the user quantity or the user quantity proportion of the service type of the network area.

With reference to the eighth aspect, in some implementations of the eighth aspect, when the second analytics information includes the RAT related information or the access frequency related information, and the RAT related information or the access frequency related information includes a recommended RAT or a recommended access frequency for a terminal device level, that the second network element determines an energy saving policy of a network area based on the second analytics information includes: The second network element determines a recommended RAT or a recommended access frequency corresponding to at least one terminal device in the network area; and the second network element determines the method for enabling or disabling, power consumption control, or load transfer of the access network network element in the network area based on the recommended RAT or the recommended access frequency corresponding to the at least one terminal device in the network area.

With reference to the eighth aspect, in some implementations of the eighth aspect, when the second analytics information includes the RAT related information or the access frequency related information, and the RAT related information or the access frequency related information includes a recommended RAT or a recommended access frequency for a terminal device-level service type, a method in which the second network element determines an energy saving policy of a network area based on the second analytics information includes: The second network element determines a service type that has been initiated or is to be initiated by the terminal device in the network area; the second network element determines a recommended RAT or a recommended access frequency corresponding to the service type that has been initiated or is to be initiated by the terminal device; and the second network element determines the method for enabling or disabling, power consumption control, or load transfer of the access network network element based on the recommended RAT or the recommended access frequency corresponding to the service type that has been initiated or is to be initiated by the terminal device.

With reference to the eighth aspect, in some implementations of the eighth aspect, when the second analytics information includes the service experience analytics information corresponding to the RAT or the access frequency, and the service experience analytics information corresponding to the RAT or the access frequency includes corresponding service experience for at least one service type in the RAT or the access frequency, a method in which the second network element determines an energy saving policy of a network area based on the second analytics information includes: The second network element determines the service type of the network area, where the service type of the network area refers to at least one service type that has been initiated or is to be initiated in the network area; for the service type of the network area, the second network element determines the target RAT or the target access frequency in the service experience analytics information corresponding to the RAT or the access frequency, so that service experience corresponding to the service type of the network area in the target RAT or the target access frequency can meet a preset condition; the second network element determines the user quantity or the user quantity proportion of the service type in the network area; and the second network element determines the method for enabling or disabling, power consumption control, or load transfer of the access network network element based on the user quantity or the user quantity proportion of the service type of the network area and the target RAT or the target access frequency corresponding to the service type of the network area.

With reference to the eighth aspect, in some implementations of the eighth aspect, when the second analytics information includes the service experience analytics information corresponding to the RAT or the access frequency, and the service experience analytics information corresponding to the RAT or the access frequency includes corresponding service experience for a terminal device-level service type in the RAT or the access frequency, a method in which the second network element determines an energy saving policy of a network area based on the second analytics information includes: The second network element determines a service type that has been initiated or is to be initiated by the terminal device in the network area; for the service type that has been initiated or is to be initiated by the terminal device, the second network element determines the target RAT or the target access frequency in the service experience analytics information corresponding to the RAT or the access frequency, so that corresponding service experience for the service type that is in the target RAT or the target access frequency and that has been initiated or is to be initiated by the terminal device can meet the preset condition; and the second network element determines the method for enabling or disabling, power consumption control, or load transfer of the access network network element based on the service type that has been initiated or is to be initiated by the terminal device and the target RAT or the target access frequency corresponding to the service type that has been initiated or is to be initiated by the single terminal device.

With reference to the eighth aspect, in some implementations of the eighth aspect, the second analytics information further includes service behavior analytics information, and the service behavior analytics information includes service behavior analytics information of the terminal device that is aggregated in the network area; and that the second network element determines a service type of the network area includes: The second network element determines the service type of the network area based on the service behavior analytics information of the terminal device that is aggregated in the network area.

With reference to the eighth aspect, in some implementations of the eighth aspect, the second analytics information further includes service behavior analytics information, and the service behavior analytics information includes terminal device-level service behavior analytics information; and that the second network element determines a service type that has been initiated or is to be initiated by the terminal device in the network area includes: The second network element determines, based on the terminal device-level service behavior analytics information, the service type that has been initiated or is to be initiated by the terminal device in the network area.

With reference to the eighth aspect, in some implementations of the eighth aspect, the method further includes: The second network element obtains an applicable condition of the second analytics information, where the applicable condition includes at least one of the following information: the service type, a user type, a user identifier, the time information, and the area information.

With reference to the eighth aspect, in some implementations of the eighth aspect, when the second network element is a core network element or a network management network element, the method further includes: The second network element sends the energy saving policy of the network area to an access network element; or the second network element sends the energy saving policy of the network area to a network management execution network element.

With reference to the eighth aspect, in some implementations of the eighth aspect, the method further includes: The second network element sends an applicable condition of the energy saving policy of the network area to the access network element or the network management execution network element, where the applicable condition includes at least one of the following information: the service type, a user type, a user identifier, the time information, and the area information.

With reference to the eighth aspect, in some implementations of the eighth aspect, when the second network element is an access network element, the method further includes: The second network element performs the method for enabling or disabling, power consumption control, or load transfer of the access network network element based on the energy saving policy of the network area.

With reference to the eighth aspect, in some implementations of the eighth aspect, that a second network element obtains second analytics information from a data analytics network element includes: The second network element sends a second request message to the data analytics network element, where the second request message includes at least one piece of area information, and the second request message is used to request to obtain the second analytics information corresponding to the area information; and the second network element receives a second response message sent by the data analytics network element, where the second response message includes the second analytics information.

With reference to the eighth aspect, in some implementations of the eighth aspect, that a second network element obtains second analytics information from a data analytics network element includes: The second network element sends a second request message to the data analytics network element, where the second request message includes the service type, and the second request message is used to request to obtain the second analytics information corresponding to the service type; and the second network element receives a second response message sent by the data analytics network element, where the second response message includes the second analytics information.

With reference to the eighth aspect, in some implementations of the eighth aspect, the service behavior analytics information includes the terminal device-level service behavior analytics information or the service behavior analytics information of the terminal device that is aggregated in the network area.

With reference to the eighth aspect, in some implementations of the eighth aspect, the service behavior analytics information includes service behavior statistics information or service behavior prediction information.

With reference to the eighth aspect, in some implementations of the eighth aspect, the service behavior analytics information includes at least one of the following information: the identifier, the time information, the area information, the service type, priority information of the service type, an occurrence probability of the service type, duration of the service type, the user quantity corresponding to the service type, and the user quantity proportion of the service type of the terminal device.

According to a ninth aspect, a first communication apparatus is provided. The first communication apparatus includes at least one processor. The at least one processor is configured to: be coupled to a memory, and read and execute instructions in the memory, to implement the method according to any one of the sixth aspect to the eighth aspect and the implementations of the sixth aspect to the eighth aspect.

According to a tenth aspect, a computer storage medium is provided. The computer storage medium stores computer-executable instructions; and when the computer-executable instructions are invoked by a computer, the computer-executable instructions are used to enable the computer to perform the method according to any one of the sixth aspect to the eighth aspect and the implementations of the sixth aspect to the eighth aspect.

According to an eleventh aspect, an embodiment of this application provides a chip or a chip system. The chip or the chip system includes at least one processor and a communication interface. The communication interface and the at least one processor are interconnected through a line. The at least one processor is configured to run a computer program or instructions, to perform the method according to any one of the first aspect or the sixth aspect to the eighth aspect and the implementations of the first aspect or the sixth aspect to the eighth aspect. The communication interface in the chip may be an input/output interface, a pin, a circuit, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) of the chip.

DESCRIPTION OF EMBODIMENTS

The following describes technical solutions of this application with reference to accompanying drawings.

Figure 1:
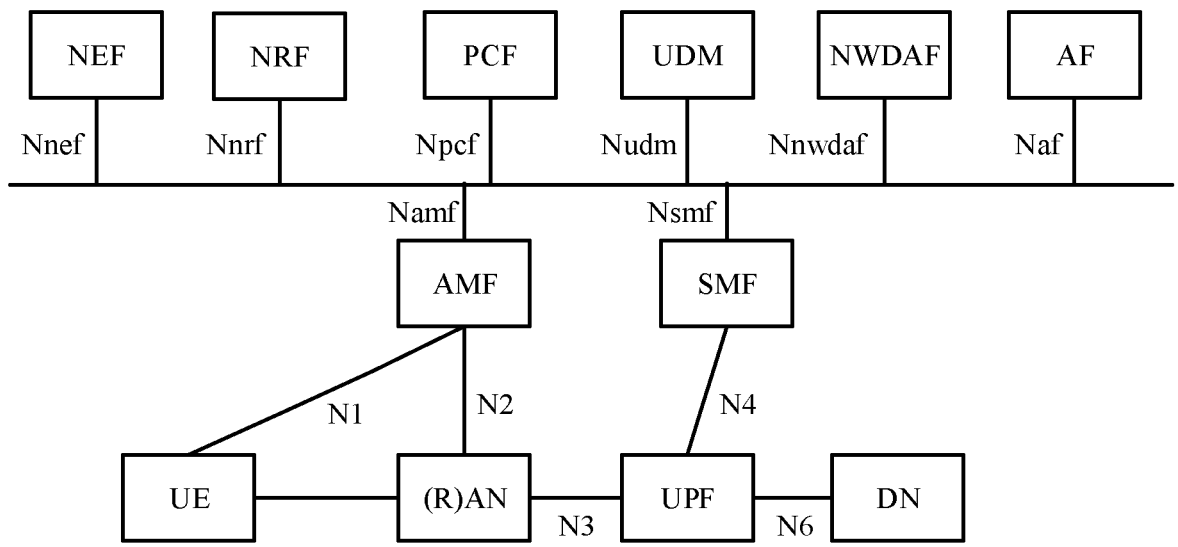
FIG. 1 is a schematic diagram of a service-based network architecture according to an embodiment of this application.

FIG. 1 is a schematic diagram of a service-based network architecture according to an embodiment of this application. As shown in FIG. 1, the network architecture shown in FIG. 1 may include three parts: a terminal device part, a data network (DN), and an operator network part. The following briefly describes functions of some network elements.

The operator network may include one or more of the following network elements: a network exposure function (NEF) network element, a network repository function (NRF) network element, a policy control function (PCF) network element, a unified data management (UDM) network element, a network data analytics function (NWDAF) network element, an application function (AF) network element, an access and mobility management function (AMF) network element, a session management function (SMF) network element, a radio access network (RAN), a unified data repository (UDR) (which is not shown in the figure), a user plane function (UPF) network element, and the like. In the foregoing operator network, parts other than the radio access network may be referred to as core network parts.

The terminal device, which may also be referred to as user equipment (UE), is a device that has a wireless transceiver function. The terminal device may be deployed on land, where the deployment includes indoor or outdoor, or handheld or vehicle-mounted deployment; may be deployed on a water surface (for example, on a ship); or may be deployed in the air (for example, on an airplane, a balloon, or a satellite). The terminal device may be a mobile phone, a tablet computer (pad), a computer that has a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, and the like. For ease of description, in this application, UE is subsequently used to replace the terminal device for description.

The terminal device may establish a connection to the operator network through an interface (for example, N1) provided by the operator network, and use services such as a data service and/or a voice service provided by the operator network. The terminal device may further access the DN through the operator network, and use an operator service deployed on the DN and/or a service provided by a third party. The third party may be a service provider other than the operator network and the terminal device, and may provide services such as a data service and/or a voice service for the terminal device. A specific representation form of the third party may be specifically determined based on an actual application scenario, and is not limited herein.

The RAN is a sub-network of the operator network, and is an implementation system between a service node in the operator network and the terminal device. To access the operator network, the terminal device first passes through the RAN, and may be connected to the service node of the operator network through the RAN. A RAN device in this application is a device that provides a wireless communication function for the terminal device, and the RAN device is also referred to as an access network device. The RAN device in this application includes but is not limited to: a next generation NodeB (gNodeB, gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like.

The AMF network element, which is also referred to as a mobility management function, is responsible for user mobility management, including mobility status management, temporary user identity allocation, and user authentication and authorization.

The SMF network element, which is also referred to as a session management function, is responsible for UPF selection, UPF reselection, IP address allocation, bearer establishment, modification, and release, and QoS control.

The UPF network element supports all or some of the following functions: interconnecting a protocol data unit (PDU) session to a data network; routing and forwarding of a packet (for example, supporting forwarding traffic to a data network after performing an uplink classification, and supporting a branching point to support a multi-homed PDU session); and detecting a packet.

The DN is a network outside the operator network. The operator network may access a plurality of DNs. A plurality of services may be deployed on the DN, and the DN may provide services such as a data service and/or a voice service for the terminal device. For example, the DN is a private network of a smart factory, a sensor installed in a workshop of the smart factory may be a terminal device, a control server of the sensor is deployed on the DN, and the control server may provide a service for the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

The UDM network element is responsible for managing subscription data, and is responsible for notifying a corresponding network element when the subscription data is modified.

The UDR is configured to store and retrieve subscription data, policy data, and common architecture data, and is used by the UDM, the PCF, and the NEF to obtain related data. The UDR needs to provide different data access authentication mechanisms for different types of data, such as subscription data and policy data, to ensure data access security. The UDR needs to return a failure response with an appropriate cause value for an invalid service-based operation or data access request.

The NEF network element is mainly configured to support capability and event exposure.

The AF network element provides an application-layer service for the UE. When providing the service for the UE, the AF has a requirement for a QoS policy and a charging policy, and needs to notify a network. In addition, the AF also requires application-related information fed back by the core network.

The PCF network element performs functions of policy control decision and flow-based charging control, and the functions include a user subscription data management function, a policy control function, a charging policy control function, QoS control, and the like.

The NRF network element may be configured to provide a network element discovery function and provide network element information corresponding to a network element type based on a request from another network element. The NRF further provides a network element management service, for example, registration, update, and deregistration of a network element and subscription and push of a network element status.

The NWDAF network element may be configured to collect, train, and analyze data, and deliver an analytics result to another function network element, to help the another function network element optimize corresponding policy control. For example, the NWDAF provides mobility analytics information of the terminal device for the AMF, to assist the AMF in formulating a mobility-related policy, or the NWDAF provides session analytics information of the terminal device for the SMF, to assist the SMF in formulating a session management-related policy.

In FIG. 1, Nnef, Nnrf, Npcf, Nudm, Nnwdaf, Naf, Namf, Nsmf, N1, N2, N3, N4, and N6 are interface sequence numbers. For meanings of these interface sequence numbers, refer to meanings defined in the 3rd generation partnership project (3GPP) standard protocol. This is not limited herein.

Figure 2:
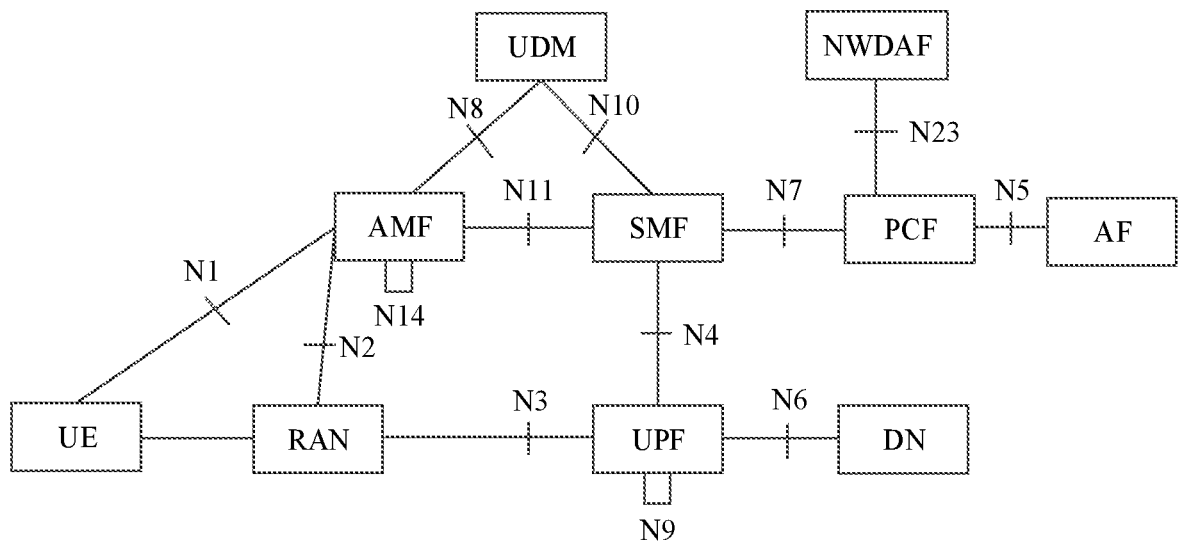
FIG. 2 is a schematic diagram of a reference point-based network architecture according to an embodiment of this application.

FIG. 2 is a schematic diagram of a reference point-based network architecture according to an embodiment of this application. As shown in FIG. 2, the network architecture is also a point-to-point interface-based network architecture. For descriptions of functions of network elements in FIG. 2, refer to descriptions of functions of corresponding network elements in FIG. 1. Details are not described again. A main difference between FIG. 2 and FIG. 1 lies in that an interface between network elements in FIG. 2 is a point-to-point interface rather than a service-based interface. It should be noted that FIG. 2 further includes other network elements such as an NEF network element, an NRF network element, a UDR, and an NWDAF network element, which are not shown in FIG. 2.

In the architecture shown in FIG. 2, an interface between a UE and an AMF network element is referred to as an N1 interface, an interface between the AMF network element and a RAN device is referred to as an N2 interface, an interface between the RAN device and a UPF network element is referred to as an N3 interface, an interface between an SMF network element and the UPF network element is referred to as an N4 interface, an interface between a PCF network element and an AF network element is referred to as an N5 interface, an interface between the UPF network element and a DN is referred to as an N6 interface, an interface between the SMF network element and the PCF network element is referred to as an N7 interface, an interface between the AMF network element and a UDM network element is referred to as an N8 interface, an interface between different UPF network elements is referred to as an N9 interface, an interface between the UDM network element and the SMF network element is referred to as an N10 interface, an interface between the AMF network element and the SMF network element is referred to as an N11 interface, an interface between different AMF network elements is referred to as an N14 interface, and an interface between the AMF network element and the PCF network element is referred to as an N15 interface.

It may be understood that the network elements or the functions may be network elements in a hardware device, may be software functions running on dedicated hardware, or may be virtualized functions instantiated on a platform (for example, a cloud platform). Optionally, the network elements or the functions may be implemented by one device, or may be jointly implemented by a plurality of devices, or may be one function module in one device. This is not specifically limited in embodiments of this application.

The mobility management network element, the session management network element, the policy control network element, the application function network element, the access network device, the network exposure function network element, and the user plane network element in this application may be respectively the AMF, the SMF, the PCF, the AF, the RAN, the NEF, and the UPF in FIG. 1 or FIG. 2, or may be network elements that have functions of the AMF, the SMF, the PCF, the AF, the RAN, the NEF, and the UPF in future communication such as a 6th generation (6G) network. This is not limited in this application. For ease of description, that the mobility management network element, the session management network element, the policy control network element, the application function network element, the access network device, the network exposure function network element, and the user plane network element are respectively the AMF, the SMF, the PCF, the AF, the RAN, the NEF, and the UPF is used an example for description in this application. In addition, in this application, an example in which the terminal device is UE is used for description.

The data analytics network element in this application may be a network element that has data collection, training, analysis, and inference functions; and may collect related data from a network function network element, a third-party service server, the terminal device, or a network management system, perform analysis and training based on the related data, and provide data analytics information for the network function network element, the third-party service server, the terminal device, or the network management system. For example, the data analytics network element may be an NWDAF, or a management data analytics service (MDAS). The data analytics network element may be an independent network element, may be a combination of a plurality of network elements, or may be integrated with another network element.

A network in the present disclosure may be any network type of a PLMN, a private network, a network slice, a slice instance, or a slice subnet instance. For ease of description, the present disclosure does not explicitly reflect that training data collected by the data analytics network element and analytics information generated by the data analytics network element include information about a network identifier. For example, for a network slice, training data actually collected by the data analytics network element or analytics information generated by the data analytics network element may include information about a slice identifier, for example, network slice selection assistance information (NSSAI), single network slice selection assistance information (S-NSSAI), a network slice instance (NSI) ID, and a network slice subnet instance (NSSI) ID.

All analytics information described in the present disclosure may be statistics information or prediction information. For example, service experience analytics information may be service experience statistics information or service experience prediction information, and service behavior analytics information may be service behavior statistics information or service behavior prediction information.

Figure 3:
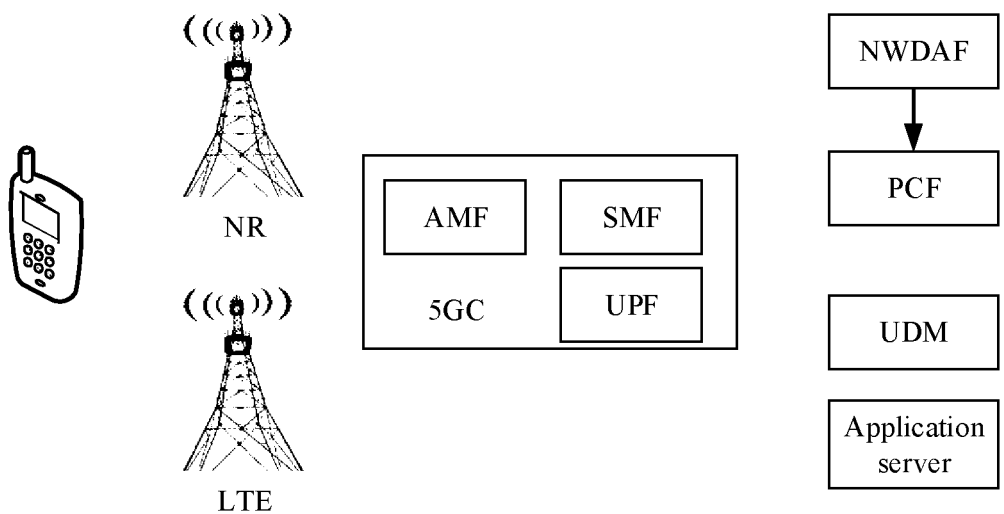
FIG. 3 is a schematic diagram of a dual connectivity 5G network architecture according to an embodiment of this application.
Figure 4:
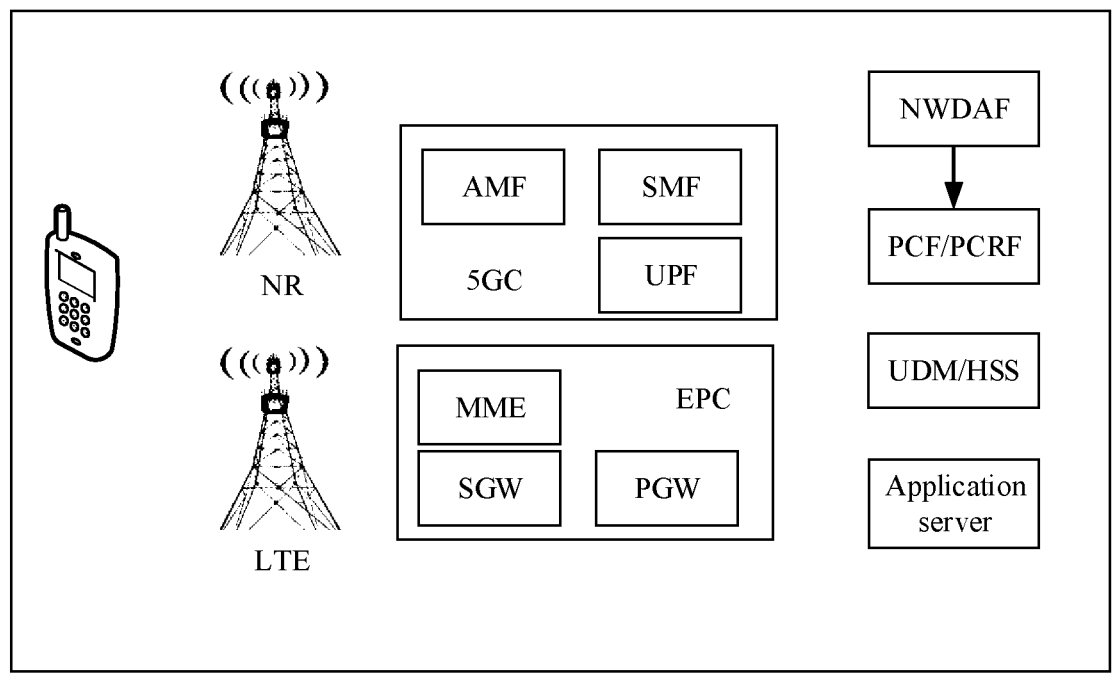
FIG. 4 is a schematic diagram of a single connectivity network architecture according to an embodiment of this application.

FIG. 3 is a schematic diagram of a dual connectivity 5G network architecture according to an embodiment of this application. FIG. 4 is a schematic diagram of an architecture of interworking between a single connectivity 5G network and a single connectivity 4G network according to an embodiment of this application.

In the network architecture shown in FIG. 3, a terminal device may access a 5G network by using an NR or LTE standard, but core networks corresponding to the terminal device are same core networks 5GCs. However, in the network architecture shown in FIG. 4, the terminal device may access a 4G network by using an LTE technology and access a 5G network by using an NR technology, and core networks corresponding to the terminal device are core networks EPC and 5GC, which are independent of each other.

For the architecture in FIG. 3, in a 5G network, there is a network deployment scenario in which access networks of two radio access types (RAT): enhanced long term evolution (eLTE) and new radio (NR) coexist, and there may be a plurality of access frequencies (for example, 2.6 GHz, 3.5 GHz, 700 MHz, and 900 MHz) for each RAT.

For the architecture in FIG. 4, before the 4G network is completely retired, there is an interworking scenario of the terminal device in the 5G network and the 4G network, RATs in the 5G network and the 4G network may be different, and there may be a plurality of access frequencies for each RAT.

For the foregoing two scenarios, the following problems may exist: (1) Different services need to be carried by using different RATs or access frequencies to achieve a better service effect. For example, a voice service in an eLTE/LTE network is more stable, and cloud AR/VR is more sensitive to a data rate and a delay, so that the cloud AR/VR needs to be run in NR. (2) Allocation of a RAT or an access frequency can be performed for users and services of different values. For example, NR has high costs and good quality, and preferentially serves high-value services and users. (3) For purposes of network load balancing, energy saving, and the like, an allocation scheme of a RAT or an access frequency needs to dynamically and adaptively change based on time and places. For example, when NR load is low, some low-value services can be served. On the contrary, when low-value services are transferred to eLTE/LTE, or a RAT or an access frequency needs to be disabled due to low cell usage within a time segment, an existing user needs to be transferred to another RAT or another access frequency.

This application provides a policy determining method. A data analytics network element generates analytics information based on obtained network data and service data, and provides the analytics information for a network function network element. The network function network element allocates a dynamically variable RAT or access frequency to a terminal device based on the analytics information, to meet a service experience requirement of the terminal device. In this embodiment of this application, an NWDAF may be replaced with any other network element or functional module that has a data analytics capability. The network function network element may be a core network element, an access network element, a terminal device, an application server, a network management network element, or the like. This is not limited herein.

Figure 5:
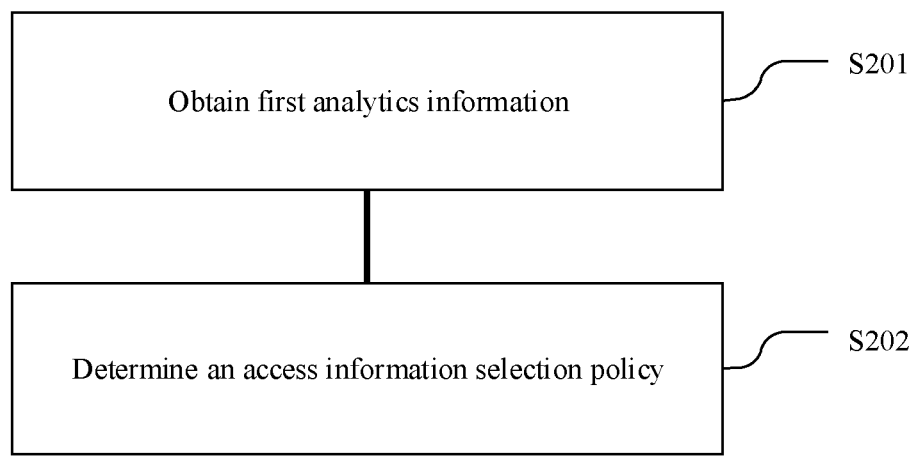
FIG. 5 is a schematic flowchart of a policy determining method according to an embodiment of this application.

FIG. 5 is a schematic flowchart of a policy determining method according to an embodiment of this application.

S201: A first network element obtains first analytics information from a data analytics network element, where the first analytics information includes at least one of the following information: RAT related information or access frequency related information, and service experience analytics information corresponding to a RAT or an access frequency.

It should be understood that the first network element may be a network element that has a decision-making function, and may provide various related policies for a network device or a terminal device. For example, the first network element may be a PCF, an AMF, or a RAN. The first network element in this embodiment specifically relates to decision-making of a radio access information policy. The data analytics network element may be a network element that has data collection, training, analysis, and inference functions; and may collect related data from a network function network element, a third-party service server, a terminal device, or a network management system, perform analysis and training based on the related data, and provide data analytics information for the network function network element, the third-party service server, the terminal device, or the network management system. For example, the data analytics network element may be an NWDAF, an MDAS, or the like. The data analytics network element may be an independent network element, may be a combination of a plurality of network elements, or may be integrated with the first network element or another network element.

Optionally, the RAT related information or the access frequency related information includes at least one of the following information: an identifier, a service type, a recommended RAT or a recommended access frequency, time information, and area information of the terminal device. The RAT related information or the access frequency related information may be a recommended RAT or a recommended access frequency for at least one terminal device. For example, for a specific terminal device, eLTE or 700 MHz may be recommended for access. Alternatively, the RAT related information or the access frequency related information may be a recommended RAT or a recommended access frequency for at least one service type. For example, for a voice service, eLTE or 700 MHz may be recommended for access. Alternatively, the RAT related information or the access frequency related information may be a recommended RAT or access frequency for at least one service type of at least one terminal device. For example, for an AR/VR service that is being performed by the terminal device, NR or 3.5 GHz may be recommended for access; and for a voice service that is being performed by the terminal device, eLTE or 700 MHz may be recommended for access. In addition, the RAT related information or the access frequency related information may dynamically change with time, places, or other factors. For example, when the terminal device uses a voice service on a metro or uses a voice service on a square, different RATs or frequencies are recommended. This may be specifically configured based on an actual requirement.

It should be understood that the service type or the service type of the terminal device in this application may be only one or more service types.

Optionally, the service experience analytics information corresponding to the RAT or the access frequency includes at least one of the following information: the identifier, the service type, the RAT or the access frequency, service experience for the service type, the time information, and the area information of the terminal device. The service experience analytics information corresponding to the RAT or the access frequency may be used to indicate service experience corresponding to at least one service type in the RAT or the access frequency. For example, a mean opinion score (MOS) of a voice service in NR/3.5 GHz is 3, and the MOS of the voice service in LTE/700 MHz is 4.5. The service experience analytics information corresponding to the RAT or the access frequency may be further used to indicate service experience corresponding to at least one service type of at least one terminal device in the RAT or the access frequency. For example, a mean opinion score (MOS) of a voice service of a specific terminal device in NR/3.5 GHz is 3.5, and the MOS of the voice service of the terminal device in LTE/700 MHz is 4.

In the present disclosure, service experience is represented by an MOS or others, for example, a delay, smoothness, a throughput, a packet loss rate, a jitter, or traffic. Alternatively, the service experience may be represented by a combination of a plurality of experience parameters, for example, experience of a combination of a delay and smoothness. This is not limited herein. Optionally, the first network element may be a core network element, a network management network element, an application server, or the like. The core network element includes a control plane network element or a user plane network element.

Optionally, the first network element may be an access network element, for example, a RAN. The access network element may directly obtain the first analytics information provided by the data analytics network element, and perform a related RAT or frequency selection operation for the terminal device based on the first analytics information. For example, after the access network element selects an appropriate target RAT or an appropriate target access frequency for the terminal device based on the first analytics information, if the terminal is in a connected mode, the access network element may hand over, through a handover procedure, the terminal device to a target cell corresponding to the target RAT or the target access frequency. Alternatively, the access network element may send a related target RAT or a related target access frequency to the terminal device through a redirection procedure, so that after entering an idle mode, the terminal device can choose to access a cell corresponding to the target RAT or the target access frequency. For another example, after the access network element selects an appropriate target RAT or an appropriate target access frequency for the terminal device based on the first analytics information, if the terminal is currently in an idle mode, the access network element may wait until the terminal device enters a connected mode. Alternatively, after the access network pages the terminal device to the connected mode, the access network then enables, by using a handover or redirection method in the connected mode, the terminal device to access a cell corresponding to the target RAT or the target access frequency.

Optionally, the first network element may be a terminal device. The terminal device directly obtains the first analytics information provided by the data analytics network element, and accesses a related RAT or a related frequency with reference to the first analytics information. For example, the terminal device selects an appropriate target RAT or an appropriate target access frequency based on the first analytics information, and the terminal device may access, through network reselection or cell reselection, a cell corresponding to the target RAT or the target access frequency.

S202: The first network element determines an access information selection policy of the terminal device based on the first analytics information, where the access information selection policy includes a target RAT or a target access frequency corresponding to the terminal device.

Optionally, the first network element determines, based on the first analytics information, the target RAT or the target access frequency corresponding to the terminal device, so that service experience for the service type of the terminal device in the target RAT or the target access frequency can meet a preset condition. The service type of the terminal device may include one or more service types of the terminal device.

In a possible implementation, when the first analytics information is the RAT related information or the access frequency related information, and the RAT or access frequency information includes a recommended RAT or a recommended access frequency for the terminal device, a method in which the first network element determines an access information selection policy of the terminal device based on the first analytics information includes: The first network element determines the recommended RAT or the recommended access frequency for the terminal device as the target RAT or the target access frequency corresponding to the terminal device. As shown in Table 1 below, the first analytics information includes a recommended RAT or a recommended frequency for a terminal device A, a terminal device B, and a terminal device C. In this case, the first network element determines the recommended RAT or the recommended frequency eLTE/900 MHz for the terminal device A as a target RAT or a target access frequency of the terminal device A. With eLTE/900 MHz used, service experience of the terminal device A can meet a preset condition.

TABLE 1

| Terminal device | RAT or access frequency | Service experience | Recommended RAT or access frequency |
| --- | --- | --- | --- |
| Terminal device A | NR/3.5 GHz | 2.8 | eLTE/900 MHz |
| Terminal device A | NR/2.6 GHz | 3 | |
| Terminal device A | eLTE/900 MHz | 4.5 | |
| Terminal device B | NR/3.5 GHz | 4 | NR/3.5 GHz |
| Terminal device B | LTE/700 MHz | 3 | |
| Terminal device C | NR/3.5 GHz | 4.5 | NR/3.5 GHz |
| Terminal device C | eLTE/900 MHz | 4.2 | |

In a possible implementation, when the first analytics information is the RAT related information or the access frequency related information, and the RAT or access frequency information includes a recommended RAT or a recommended access frequency for at least one service type, a method in which the first network element determines an access information selection policy of the terminal device based on the first analytics information includes: The first network element determines a service type that has been initiated or is to be initiated by the terminal device, and the first network element determines the recommended RAT or the recommended access frequency corresponding to the service type that has been initiated or is to be initiated by the terminal device as the target RAT or the target access frequency corresponding to the terminal device. As shown in Table 2 below, the first analytics information includes recommended RATs or recommended frequencies for a service A, a service B, and a service C. If the first network element determines a service type A that has been initiated or is to be initiated by the terminal device, the first network element determines a recommended RAT or a recommended frequency eLTE/900 MHz for the service A as the target RAT or the target access frequency of the terminal device. With eLTE/900 MHz used, experience for the service A of the terminal device A can meet a preset condition.

TABLE 2

| Service type | RAT or access frequency | Service experience | Recommended RAT or access frequency |
| --- | --- | --- | --- |
| Service A | NR/3.5 GHz | 2.8 | eLTE/900 MHz |
| Service A | NR/2.6 GHz | 3 | |
| Service A | eLTE/900 MHz | 4.5 | |
| Service B | NR/3.5 GHz | 4 | NR/3.5 GHz |
| Service B | LTE/700 MHz | 3 | |
| Service C | NR/3.5 GHz | 4.5 | NR/3.5 GHz |
| Service C | eLTE/900 MHz | 4.2 | |

In a possible implementation, when the first analytics information is the RAT related information or the access frequency related information, and the RAT or access frequency information includes a recommended RAT or a recommended access frequency for at least one service type of the terminal device, a method in which the first network element determines an access information selection policy of the terminal device based on the first analytics information includes: The first network element determines a service type that has been initiated or is to be initiated by the terminal device, and the first network element determines the recommended RAT or the recommended access frequency corresponding to the service type that has been initiated or is to be initiated by the terminal device as the target RAT or the target access frequency corresponding to the terminal device. As shown in Table 3 below, for example, the first analytics information includes recommended RATs or recommended frequencies for a service A of a terminal device A, a service B of the terminal device A, a service A of a terminal device B, and a service C of the terminal device B. If the first network element determines the service A that has been initiated or is to be initiated by the terminal device A, the first network element determines a recommended RAT or a recommended frequency NR/2.6 GHz for the service A of the terminal device A as the target RAT or the target access frequency of the terminal device A. With NR/2.6 GHz used, experience for the service A of the terminal device A can meet a preset condition.

TABLE 3

| Service type | RAT or access frequency | Service experience | Recommended RAT or access frequency |
| --- | --- | --- | --- |
| Service A of the terminal device A | NR/3.5 GHz | 2.8 | NR/2.6 GHz |
| Service A of the terminal device A | NR/2.6 GHz | 3 | |
| Service B of the terminal device A | eLTE/900 MHz | 4.5 | NR/3.5 GHz |
| Service B of the terminal device A | NR/3.5 GHz | 4 | |
| Service A of the terminal device B | LTE/700 MHz | 3 | NR/3.5 GHz |
| Service A of the terminal device B | NR/3.5 GHz | 4.5 | |
| Service C of the terminal device B | eLTE/900 MHz | 4.2 | eLTE/900 MHz |

In a possible implementation, when the first analytics information is the service experience analytics information corresponding to the RAT or the access frequency, and the service experience analytics information corresponding to the RAT or the access frequency includes corresponding service experience for at least one service type in the RAT or the access frequency, a method in which the first network element determines an access information selection policy of the terminal device based on the first analytics information includes: The first network element determines a service type that has been initiated or is to be initiated by the terminal device, and for the service type that has been initiated or is to be initiated by the terminal device, the first network element determines the target RAT or the target access frequency in the service experience analytics information corresponding to the RAT or the access frequency, so that corresponding service experience for the service type that is in the target RAT or the target access frequency and that has been initiated or is to be initiated by the terminal device can meet a preset condition. As shown in Table 4, for example, the first analytics information includes corresponding service experience for a service A, a service B, and a service C in the RAT or the access frequency. If the first network element determines the service A that has been initiated or is to be initiated by the terminal device, the first network element determines eLTE/900 MHz as the target RAT or the target access frequency for the terminal device based on the service experience corresponding to the service A in the RAT or the access frequency. With eLTE/900 MHz used, the experience for the service A can meet a preset condition.

TABLE 4

| Service type | RAT or access frequency | Service experience | Recommended RAT or access frequency |
| --- | --- | --- | --- |
| Service A | NR/3.5 GHz | 2.8 | eLTE/900 MHz |
| Service A | NR/2.6 GHz | 3 | |
| Service A | eLTE/900 MHz | 4.5 | |
| Service B | NR/3.5 GHz | 4 | NR/3.5 GHz |
| Service B | LTE/700 MHz | 3 | |
| Service C | NR/3.5 GHz | 4.5 | NR/3.5 GHz |
| Service C | eLTE/900 MHz | 4.2 | |

In a possible implementation, when the first analytics information is the service experience analytics information corresponding to the RAT or the access frequency, and the service experience analytics information corresponding to the RAT or the access frequency includes corresponding service experience for at least one service type of the terminal device in the RAT or the access frequency, a method in which the first network element determines an access information selection policy of the terminal device based on the first analytics information includes: The first network element determines a service type that has been initiated or is to be initiated by the terminal device, and for the service type that has been initiated or is to be initiated by the terminal device, the first network element determines the target RAT or the target access frequency in the service experience analytics information corresponding to the RAT or the access frequency, so that corresponding service experience for the service type that is in the target RAT or the target access frequency and that has been initiated or is to be initiated by the terminal device can meet a preset condition. As shown in Table 5 below, for example, the first analytics information includes corresponding service experience for a service A of a terminal device A, a service B of the terminal device A, and a service C of the terminal device A in the RAT or the access frequency. If the first network element determines the service A that has been initiated or is to be initiated by the terminal device A, the first network element determines NR/2.6 GHz as the target RAT or the target access frequency for the terminal device A based on the service experience corresponding to the service A of the terminal device A in the RAT or the access frequency. With NR/2.6 GHz used, the experience for the service A of the terminal device A can meet a preset condition.

TABLE 5

| Service type | RAT or access frequency | Service experience | Recommended RAT or access frequency |
| --- | --- | --- | --- |
| Service A of the terminal device A | NR/3.5 GHz | 2.8 | NR/2.6 GHz |
| Service A of the terminal device A | NR/2.6 GHz | 3 | |
| Service B of the terminal device A | eLTE/900 MHz | 4.5 | eLTE/900 MHz |
| Service B of the terminal device A | NR/3.5 GHz | 4 | |
| Service C of the terminal device A | LTE/700 MHz | 3 | NR/3.5 GHz |
| Service C of the terminal device A | NR/3.5 GHz | 4.5 | |

In the present disclosure, the preset condition of the service experience may be configured in the first network element or from another network element, for example, from an NWDAF. The preset condition may be that the service experience is optimal, or the service experience is greater than a specified level or value, or the like. This is not limited.

Optionally, the first network element may determine, by obtaining a service establishment request sent by a service server, the service type that has been initiated by the terminal device; or the first network element may determine, through DPI or DFI, the service type that has been initiated by the terminal device.

Optionally, the first network element may further obtain service behavior analytics information of the terminal device that is sent by the data analytics network element, and the first network element predicts, based on the service behavior analytics information of the terminal device, a service type that is to be triggered by the terminal device. The first network element may separately obtain the service behavior analytics information of the terminal device from the data analytics network element, or may obtain both the first analytics information and the service behavior analytics information of the terminal device from the data analytics network element. The service behavior analytics information of the terminal device refers to data analytics information that can reflect a situation or a rule of using a service by the terminal device. The service behavior analytics information of the terminal device includes at least one of the following information: the identifier, the time information, the area information, the service type, priority information of the service type, an occurrence probability of the service type, and duration of the service type of the terminal device.

Optionally, the service behavior analytics information of the terminal device includes service behavior statistics information of the terminal device or service behavior prediction information of the terminal device. In other words, the service behavior analytics information may be obtained through statistical collection based on historical service behavior data of the terminal device, or may be predicted, for example, predicted based on service behavior data of another terminal device of a user profile persona type the same as that of the terminal device.

Optionally, the first network element sends a first request message to the data analytics network element, where the first request message includes the service type. The service type may be one or more service types. The first request message is used to request the first analytics information corresponding to the service type. The first network element receives a first response message sent by the data analytics network element, where the first response message includes the first analytics information corresponding to the service type.

Optionally, the first network element sends a first request message to the data analytics network element, where the first request message includes the identifier of the terminal device. The identifier of the terminal device may be an identifier of a terminal device that is to determine the access information selection policy currently, or may be identifiers of a plurality of terminal devices including the identifier of the current terminal device. The first request message is used to request the first analytics information corresponding to the terminal device. The first network element receives a first response message sent by the data analytics network element, where the first response message includes the first analytics information corresponding to the terminal device.

Optionally, the first network element sends a first request message to the data analytics network element, where the first request message includes the identifier and the service type of the terminal device. The identifier of the terminal device may be an identifier of a terminal device that is to determine the access information selection policy currently, or may be identifiers of a plurality of terminal devices including the identifier of the current terminal device. The service type may be one or more service types. The first request message is used to request the first analytics information corresponding to the service type of the terminal device. The first network element receives a first response message sent by the data analytics network element, and the first response message includes the first analytics information corresponding to the service type of the terminal device.

The identifier of the terminal device in this application may include one or more of the following identifiers corresponding to the terminal device: an IMSI, an IMEI, an SUPI, a GPSI, a correlation identifier, an IP quintuple, and the like. The identifier of the terminal device may also be an identifier of a terminal device group, and in this case, the first request message is used to request first analytics information corresponding to the terminal device group.

Optionally, the first network element may further obtain an applicable condition of the first analytics information, where the applicable condition includes at least one of the following information: the service type, a user type, a user identifier, the time information, and the area information. The applicable condition of the first analytics information is used to indicate specific conditions in which the first analytics information is available.

The user type may indicate a user level or user priority information, for example, a gold user, a silver user, or a bronze user, and the user type may also indicate user classification information, for example, an office worker user or a student user.

Optionally, the user identifier may be an identifier of a single user, or may be an identifier of a user group. In this application, the user and the terminal device may have a same meaning, and the user identifier and the identifier of the terminal have a same meaning.

Optionally, the first network element determines the access information selection policy based on the first analytics information and first information, where the first information includes at least one of the following information: priority information of the service type, charging policy information of the service type, the user type of the terminal device, load or traffic information of the RAT or the access frequency, mobility mode analytics information of the terminal device, and communication mode analytics information of the terminal device. The load or traffic information of the RAT or the access frequency includes load or traffic information of different RATs or access frequencies in an area (for example, a cell or a TA). The mobility mode analytics information of the terminal device includes analytics information of a mobility management related behavior of the terminal device, for example, movement track information of the terminal device. The communication mode analytics information of the terminal device includes analytics information of a session management related behavior of the terminal device, for example, a time point at which the terminal device initiates a session and duration of the session. The first information may be from the first network element or from another network element (for example, an SMF, an AF, or an NWDAF).

For example, the first network element determines, based on a service behavior analytics result of the terminal device, that occurrence probabilities of two service types of the terminal device in a scenario are equivalent, but a priority of a service A is higher than a priority of a service B, and in this case, the first network element may select, based on service experience analytics information of the service A, a RAT or a frequency by using which best experience for the service A can be achieved, and use the RAT or the frequency as the target RAT or the target access frequency of the UE. For another example, the first network element determines, based on the foregoing two types of data analytics results, that radio access information of the terminal device is a RAT A, but network load of a cell corresponding to the RAT A (for example, NR) is already high, and a priority of the terminal device is low. In this case, the first network element may determine to select a RAT B (for example, an E-UTRAN) for the terminal device as the radio access information.

Optionally, when the first network element is a core network element, a network management network element, or a service server, the first network element sends first indication information to an access network element or the terminal device, where the first indication information may include the access information selection policy of the terminal device. According to the method, the access network element can trigger, with reference to the access information selection policy, the terminal device to access a corresponding RAT or a corresponding access frequency, where the corresponding RAT is the same as or different from the target RAT, and the corresponding access frequency is the same as or different from the target access frequency. Alternatively, according to the method, the terminal device can access, with reference to the access information selection policy, a corresponding RAT or a corresponding access frequency, where the corresponding RAT is the same as or different from the target RAT, and the corresponding access frequency is the same as or different from the target access frequency. In the present disclosure, that the terminal device accesses one RAT/access frequency generally means that the terminal device accesses a cell corresponding to a RAT or an access frequency.

Optionally, the first network element further sends an applicable condition of the access information selection policy to the access network element or the terminal device, where the applicable condition includes at least one of the following information: the service type, a user type, a user identifier, the time information, and the area information. The applicable condition of the access information selection policy is used to indicate specific conditions in which the access information selection policy is available.

Figure 6:
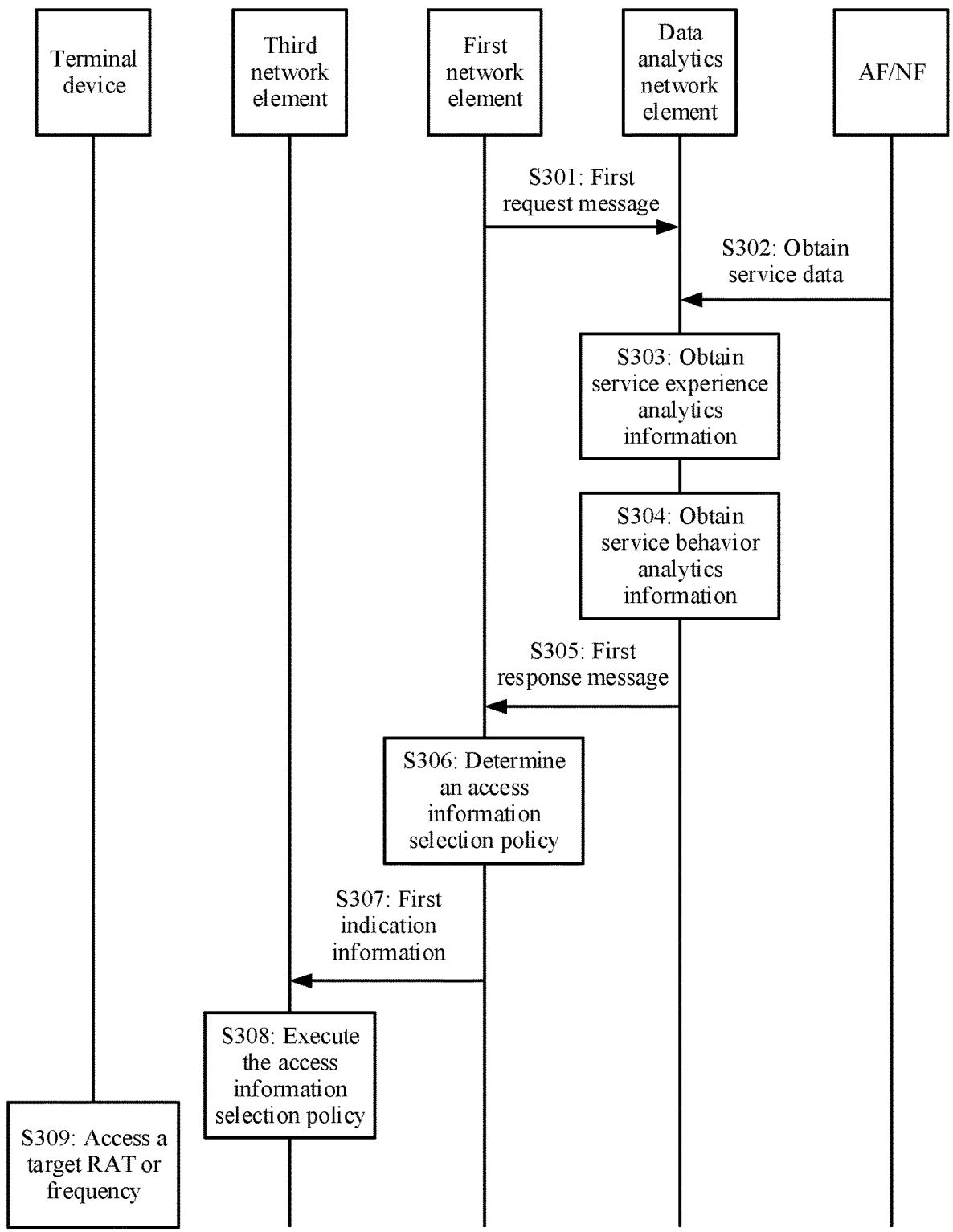
FIG. 6 is a schematic interaction diagram of a policy determining method according to an embodiment of this application.

FIG. 6 is a schematic interaction diagram of a policy determining method according to an embodiment of this application.

S301: A first network element sends a first request message to a data analytics network element. The first request message is used to obtain first analytics information from the data analytics network element. Content of the first analytics information is similar to the content of the first analytics information in the embodiment of FIG. 5, and details are not described herein again.

A method for sending, by the first network element, the first request message to the data analytics network element is similar to the method for sending, by the first network element, the first request message to the data analytics network element in the embodiment of FIG. 5, and details are not described herein again.

In a specific implementation, the first request message may carry two analytics identifiers (analytics IDs), where the first analytics identifier is used to indicate that service behavior analytics information of a terminal device is requested, and the second analytics identifier is used to indicate that the first analytics information is requested.

Optionally, the first request message includes an identifier of the terminal device, and the first request message is used to request the service behavior analytics information corresponding to the identifier of the terminal device. The identifier of the terminal device is similar to the identifier of the terminal device in the embodiment of FIG. 5, and details are not described herein again.

Optionally, the first request message includes a service type, the service type may be one or more service types, and the first request message is used to request the service behavior analytics information that is of the terminal device and that corresponds to the service type. For example, if the first request message includes a voice service type, the first request message is used to request service behavior analytics information of a voice service of the terminal device.

Optionally, when the first request information carries the first analytics identifier, the first network element may further generate the service behavior analytics information of the terminal device. The service behavior analytics information may be sent to the first network element together with the first analytics information, or may be separately sent.

Optionally, the first network element may further include filtering information in the first request message, to identify that analytics information corresponding to the filtering information or meeting a filtering condition such as a time filtering condition or a location filtering condition is requested. The analytics information may be the first analytics information or the service behavior analytics information of the terminal device. In addition, for different analytics information, the filtering information may be different. For example, filtering information of the first analytics information is filtering information 1, and filtering information of the service behavior analytics information is filtering information 2.

Optionally, the first network element may further include a reporting condition in the first request message, to indicate the data analytics network element to feed back the analytics information based on the reporting condition. For example, the reporting condition may be time set by a timer, and is used to indicate the data analytics network element to feed back the first analytics information within a period of time after receiving the first request message, or feed back the first analytics information after the first analytics information meets a preset condition, or periodically report the first analytics information. In addition, for different analytics information, the reporting condition may be different. For example, the filtering information of the first analytics information is a reporting condition 1, and the filtering information of the service behavior analytics information is a reporting condition 2.

S302: The data analytics network element obtains related training data.

Optionally, the data analytics network element may obtain data from an application function (AF) network element, a network function (NF) network element, an OAM network element, a terminal device, and the like. The NF may include a session management function (SMF) network element, an access and mobility management function (AMF) network element, a UPF, a PCF, an NRF, and the like. A network management network element includes an operation, administration and maintenance (OAM) network element, and the like.

Optionally, the data obtained by the data analytics network element may be classified into network data or service data. The network data refers to data obtained from a communication network, and may include at least one of the following information: the identifier, time information, area information, and a RAT or an access frequency of the terminal device. The service data refers to data obtained from a service server, and may include at least one of the following information: the identifier, a service type, and service experience of the terminal device.

The identifier of the terminal device may include an IMSI, an IMEI, an SUPI, a GPSI, a correlation identifier, an IP quintuple, and the like that correspond to the terminal device.

It should be understood that the identifier of the terminal device obtained by the data analytics network element may be an identifier of a terminal device that needs to be analyzed, or may be identifiers of a plurality of terminal devices including the terminal device that needs to be analyzed, or may be one or more types of identifiers of the terminal devices.

The identifier of the terminal device may be an identifier of a specific single terminal device, or may be identifiers of a plurality of terminal devices or an identifier of a terminal device group.

In a possible implementation, to obtain service behavior analytics data of the terminal device, the training data obtained by the data analytics network element may include data shown in Table 6.

TABLE 6

| Training data | Source | Description |
| --- | --- | --- |
| Identifier of the terminal device (UE ID) | AF/5GC NF/UE | Used to uniquely identify a user, for example, an international mobile subscriber identity (IMSI), a generic public subscription identifier (GPSI), and a subscriber permanent identifier (SUPI) |

TABLE 6-continued

| Training data | Source | Description |
| --- | --- | --- |
| Correlation identifier (correlation ID) of the terminal device | AF/5GC NF | Used by an NWADF to correlate user related data from the AF and the NF, such as an IP quintuple of the user or a new temporary identifier allocated by the 5GC |
| Time | AF/5GC NF | Time stamp (for example, 08:00:00) or time segment (for example, 08:00 to 08:10) |
| Area information (location area) | AMF/RAN/AF | Area in which the terminal device is located, which may be a network area (for example, a cell ID) or a geographical area (for example, Shanghai Pudong New Area) |
| Service information (application information) | AF | User service related information |
| >Information about a service identifier (application ID) | AF | Information about the service identifier, which is used to uniquely identify a service, for example, an app ID 1. |
| >Reference weight factor | AF | Reference weight factor of the service, for example, 3/5 |
| >Duration | AF | Service duration, for example, 20 minutes |
| >Concurrent service type (concurrent application(s)) | AF | Concurrent service type of the service, such as a video service and a data service |
| ... | ... | ... |

Optionally, the identifier of the terminal device in Table 6 is an identifier of a to-be-analyzed terminal device, and is used to identify a specific single terminal device or a specific single terminal device group. In other words, the data analytics network element obtains information in the foregoing table only for a specific terminal device, to analyze a service behavior of the terminal device. It should be understood that Table 6 is merely an example, and a type of obtained data is not limited in this application.

Optionally, the training data used by the data analytics network element to analyze the first analytics information may include data shown in Table 7.

TABLE 7

| Training data | Source | Description |
| --- | --- | --- |
| Identifier of the terminal device (UE ID) | AF/5GC NF/UE | Used to uniquely identify a user, for example, an IMSI, a GPSI, and an SUPI |
| Correlation identifier of the terminal device (correlation ID) | AF/5GC NF | Used by an NWADF to correlate user related data from the AF and the NF, such as an IP quintuple of the user or a new temporary identifier allocated by the 5GC |
| Time | AF/5GC NF | Time stamp (for example, 08:00:00) or time segment (for example, 08:00 to 08:10) |
| Area information (location area) | AMF/RAN/AF | Area in which the terminal device is located, which may be a network area (for example, a cell ID) or a geographical area (for example, Shanghai Pudong New Area) |
| Position in an area | AMF/RAN | Used to identify the position in the area, for example, a cell center or a cell edge |
| Signal quality | UE/RAN | Indicate the signal quality at a network position of the terminal device, for example, a reference signal received power (RSRP), reference signal received quality (RSRQ), or a signal to interference plus noise ratio (SINR). |
| Information about a service identifier (application ID) | SMF/PCF/AF | Used to uniquely identify a service, for example, an app ID 1. |
| Quality of service flow identifier (QFI) | AMF/PCF/SMF | Used to identify a quality of service flow |
| Quality of service indicator (5QI) | UPF/RAN/SMF | Used to identify a quality of service level, for example, 5QI = 5 or 1 |
| Quality of service flow bit rate (QoS flow bit rate) | UPF | Measurement value of the quality of service flow bit rate, for example, 200 Mbps |
| Quality of service flow packet loss rate (QoS flow packet loss rate) | UPF | Measurement value of the quality of service flow packet loss rate, for example, 3% |

TABLE 7-continued

| Training data | Source | Description |
|---|---|---|
| Quality of service flow packet transmission delay (QoS flow packet delay) | UPF | Measurement value of the quality of service flow packet transmission delay, for example, 2 ms |
| Packet retransmission rate (QoS flow retransmission) | UPF | Measurement value of the packet retransmission rate, for example, 2% |
| Radio access type (RAT) | PCF/SMF/RAN | Radio access type correspondingly accessed by the terminal device, for example, NR, eLTE, or LTE |
| Access frequency (frequency) | RAN/UE/AMF | Frequency correspondingly accessed by the terminal device, for example, 800 MHz, 1800 MHz, or 2600 MHz. |
| NF/radio resource status | OAM/RAN/NRF | NF or access network resource status or usage, for example, an allocated or used CUP or a storage resource |
| NF/radio load | OAM/RAN/NRF | NF or access network load, for example, high or low |
| Service experience | AF | Service experience information of the terminal device, for example, a voice MOS = 3.8 |
| . . . | . . . | . . . |

Optionally, the identifier of the terminal device in Table 7 is an identifier of a to-be-analyzed terminal device. In a possible implementation, the identifier of the terminal device is used to identify a single non-specific terminal device, that is, the data analytics network element obtains data in Table 7 for a large quantity of terminal devices. Based on this analysis, first analytics information not specific to terminal device is generated. In another possible implementation, the identifier of the terminal device is used to identify a single non-specific terminal device, that is, the data analytics network element obtains information in Table 7 for only a specific terminal device, for analyzing first analytics information of the terminal device. It should be understood that Table 7 is merely an example. A type of obtained data is not limited in this application, and each data type listed in Table 7 does not need to be mandatory. For example, the NWDAF may not need to collect, from a network element such as the AMF, a RAT or a frequency in which the terminal device is located, but obtain, from the AMF, a cell identifier of the terminal device. If the NWDAF configures a RAT or a frequency corresponding to the cell identifier, the NWDAF can also obtain RAT or frequency based service experience analytics information.

The following step 303 is described by using an example in which the first analytics information is the service experience analytics information corresponding to the RAT or the access frequency.

S303: The data analytics network element analyzes and obtains, based on the obtained training data, the service experience analytics information corresponding to the RAT or the access frequency.

The service experience analytics information corresponding to the RAT or the access frequency refers to analytics information that reflects a correlation relationship between the service experience for the service type of the terminal device and radio access information, namely, analytics information that reflects a correlation relationship between the service experience and the RAT or the access frequency, as shown in Table 8.

TABLE 8

| Analytics information | Description |
|---|---|
| Identifier of the terminal device | Used to uniquely identify a user, for example, an IMSI, a GPSI, and an SUPI |
| Correlation identifier of the terminal device | Used by an NWADF to correlate user related data from the AF and the NF, such as an IP quintuple of the user or a new temporary identifier allocated by the 5GC |
| Time | Time stamp (for example, 08:00:00) or time segment (for example, 08:00 to 08:10) |
| >Information about a service 1 identifier | Identify the service type, for example, an app ID 1 |
| >>Access information 1 | Indicate the first type of access information, for example, NR/2600M |
| >>Service experience of a service 1 in the access information 1 | Indicate the service experience of the service 1 in the first type of access information, for example, an MOS = 2.5 |
| >>Access information 2 | Indicate the second type of access information, for example, eLTE/1800M |
| >>Service experience of the service 1 in the access information 2 | Indicate the service experience of the service 1 in the second type of access information, for example, an MOS = 3.5 |
| >>Access information 3 | Indicate the third type of access information, for example, LTE/800M |

TABLE 8-continued

| Analytics information | Description |
| --- | --- |
| >>Service experience of the service 1 in the access information 3 | Indicate the service experience of the service 1 in the third type of access information, for example, an MOS = 4.5 |
| >Information about a service 2 identifier | Identify the service type, for example, an app ID 2 |
| >>Access information 1 | Indicate the first type of access information, for example, NR/2600M |
| >>Service experience of a service 2 in the access information 1 | Indicate the service experience of the service 1 in the first type of access information, for example, an MOS = 4.8 |
| . . . | . . . |

It should be understood that, how the data analytics network element obtains, based on the input training data, the service experience analytics information corresponding to the output RAT or the output access frequency is not limited herein, and the method used may be a method such as big data-based statistical collection, prediction, or the like.

S304: The data analytics network element analyzes and obtains the service behavior analytics information of the terminal device based on the obtained data.

The service behavior analytics information of the terminal device refers to data analytics information that can reflect a situation or a rule of using a service by the terminal device.

Optionally, the service behavior analytics information includes at least one of the following information: the identifier, the time information, the area information, the service type, priority information of the service type, an occurrence probability of the service type, and duration of the service type of the terminal device.

In a possible implementation, the service behavior analytics information of the terminal device that is analyzed and obtained by the data analytics network element may be shown in Table 9.

It should be understood that content of the analytics information in Table 9 is merely an example, and each piece of information is not necessarily mandatory.

Optionally, the service behavior analytics information of the terminal device includes service behavior statistics information of the terminal device or service behavior prediction information of the terminal device. In other words, content (for example, an occurrence probability of a service) included in the service behavior analytics information of the terminal device may be used as statistics information, or may be used as prediction information.

How the data analytics network element obtains the output service behavior analytics information of the terminal device based on the input data is not limited herein, and the method used may be a method such as big data-based statistical collection, prediction, or the like.

For example, when the service behavior analytics information of the terminal device is the service behavior prediction information of the terminal device, the data analytics network element needs to determine service behavior prediction information of a single terminal device.

Optionally, the data analytics network element may analyze the service behavior analytics information of the ter-

TABLE 9

| Analytics information | Description |
| --- | --- |
| Identifier of the terminal device | Used to uniquely identify a user, for example, an IMSI, a GPSI, and an SUPI |
| >Time | Time stamp (for example, 08:00:00) or time segment (for example, 08:00 to 08:10) |
| >Area information | Area information of the terminal device, which can be a network location or other geographical area information |
| >Service behavior analytics data (application information analytics) | User service behavior analytics data |
| >>Information about a service 1 identifier | Information about a service identifier, which is used to uniquely identify a service, for example, an app ID 1 |
| >>Occurrence probability | Occurrence probability of a service 1, for example, 20% |
| >>Weight factor | Weight factor of the service 1, for example, 3/5 |
| >>Duration | Duration of the service 1, for example, 20 minutes |
| >>Recommended RAT or recommended access frequency | Recommended RAT or recommended access frequency for the service 1, for example, NR |
| >>Network resource requirement (radio resource requirement) | Access network resource requirement for the service 1, for example, two units |
| >>Priority (service priority) | Priority information of the service 1, for example, a high level |
| >>Concurrent service type | Concurrent service type of the service 1 |
| >>>Information about a service 2 identifier | Information about a concurrent service 2, for example, an app ID 2 |
| >>>Occurrence probability | Occurrence probability of the concurrent service 2, for example, 20% |
| >>>Weight factor | Weight factor of the concurrent service 2, for example, 4/5 |
| >>>Duration | Duration of the concurrent service 2, for example, 20 minutes |
| . . . | . . . | minal device in a prediction manner. For example, the data analytics network element determines user profile persona classification information to which the terminal device belongs, and the data analytics network element predicts the service behavior of the terminal device based on the user profile persona classification information to which the terminal device belongs and historical service behavior information of a terminal device of a same profile persona type, to determine the service behavior analytics information of the terminal device.

Optionally, the data analytics network element collects terminal device-level network behavior data, terminal device-level service behavior data, and terminal device-level service attribute data, the data analytics network element determines a user profile persona classification model based on the terminal device-level network behavior data, the terminal device-level service behavior data, and the terminal device-level service attribute data, and the data analytics network element determines, based on the user profile persona classification model and network behavior data, service behavior data, and service attribute data of the to-be-analyzed terminal device, user profile persona classification information to which the to-be-analyzed terminal device belongs.

It should be understood that the data analytics network element may determine a service behavior of the to-be-analyzed terminal device based on another terminal device whose user profile persona classification is the same as that of the to-be-analyzed terminal device. That is, if a historical service behavior of the another terminal device is the same as or similar to that of the to-be-analyzed terminal device, for example, if a same service behavior was performed at some time points or some places in the past, the service behavior of the to-be-analyzed terminal device may be predicted based on a service behavior performed by the another terminal device at current time or a current place.

It should be noted that steps 302 to 304 do not depend on step 301, and there is no time sequence between steps 302 to 304 and step 301. In other words, the data analytics network element may obtain related training data in advance and generate related analytics information, and does not necessarily perform a related operation only after receiving the first request message.

S305: The data analytics network element sends a first response message to the first network element, where the first response message includes the first analytics information.

The first analytics information is an analytics message corresponding to the first request message in S301.

Optionally, the first response message further includes the service behavior analytics information of the terminal device.

It should be understood that the service behavior analytics information of the terminal device may not be included in the first response message, or may be separately sent.

Optionally, the service experience analytics information and the service behavior analytics information may dynamically change with a scenario. In other words, the service experience analytics information and the service behavior analytics information may be sent at a time, or may be sent in several times.

Optionally, the data analytics network element may separately send an applicable condition of the analytics information to the first network element, that is, the applicable condition of the analytics information is not included in the service experience analytics information or the service behavior analytics information, and may be included in the first response message for sending; or may be separately sent, and not be included in the first response message.

S306: The first network element obtains the first analytics information, and determines an access information selection policy of the terminal device.

The access information selection policy of the terminal device is used to indicate a corresponding target RAT or a corresponding target access frequency that the terminal device needs to access in a scenario (time, a place, or the like).

In a possible implementation, the access information selection policy determined by the first network element may be represented as that the first network element generates a dynamically variable RAT/frequency selection priority (RFSP)/subscriber profile ID for RAT/frequency selection priority (SPID) for the terminal device. The RFSP/SPID is used to indicate a RAT or access frequency selection priority. For example, in a scenario (time or a place), if the RFSP/SPID indicates that an NR selection priority is the highest, it indicates that the terminal device needs to select NR for camping in this case. In another scenario, if the RFSP/SPID indicates that an evolved access network (E-UTRAN) selection priority is the highest, the terminal device needs to select the E-UTRAN for camping in this case.

It should be understood that, in addition to the manner of the RFSP/SPID, the access information selection policy may be represented by others, provided that the access network element can assist the access network element in selecting the target RAT or the target access frequency for the terminal device or the terminal device selects the target RAT or the target access frequency.

Optionally, the first network element may determine the access information selection policy of the terminal device in two steps.

Step 1: The first network element determines, based on the service behavior analytics information of the terminal device, the service type to be used by the terminal device in a scenario (time, a place, or the terminal device).

For example, the selected service type is usually a service type that is most likely to be used by the terminal device in a current scenario, or the selected service type may be a service type that is used by the terminal device for the longest time in a current scenario, or the selected service type is a service type with the highest priority of the terminal device in a current scenario.

Step 2: Based on the service type obtained in step 1, the first network element determines the target RAT or the target access frequency based on the first analytics information. The service experience of the terminal device can meet the preset condition with the target RAT or the target access frequency used. For example, an MOS of a voice service of the terminal device can exceed 3 scores with eLTE/700 MHz used. In this case, eLTE/700 MHz is used as a target RAT or a target access frequency corresponding to the terminal device when the terminal device initiates the voice service. For another example, it is recommended by the NWDAF that a voice service of the terminal device access eLTE/700 MHz. In this case, eLTE/700 MHz is used as a target RAT or a target access frequency corresponding to the terminal device when the terminal device initiates the voice service.

Optionally, in addition to the foregoing two types of data analytics information, the first network element may further determine the access information selection policy of the terminal device by considering first information. The first information may include but is not limited to at least one of the following information:

service priority information, for example, a high priority, a low priority, or a priority value;

service charging policy information, for example, a high, medium, or low tariff, or a tariff value;

the user type of the terminal device, where the user type may be level information, for example, a gold user, a silver user, or a bronze user, and the user type may also indicate user classification information, for example, an office worker user or a student user;

mobility mode analytics information of the terminal device, for example, movement track information of the terminal device, and whether the terminal device is an unmovable physical network terminal device;

communication mode analytics information of the terminal device, for example, a communication habit of the terminal device; and load or traffic information of the RAT or the access frequency, for example, an NR RAT cell is heavily loaded, and an eLTE cell is lightly loaded.

Optionally, the first information may be configured in a network such as the first network element, or may be obtained from another network element such as an AMF, a charging system, or the data analytics network element.

For example, the first network element determines, based on the service behavior analytics information of the terminal device, that occurrence probabilities of two service types of the terminal device in a scenario are equivalent, but a priority of a service A is higher than a priority of a service B, and in this case, the first network element may select, based on service experience analytics information of the service A, a RAT or an access frequency by using which best experience for the service A can be achieved.

For another example, the first network element determines, based on the foregoing two types of data analytics information, that radio access information of the terminal device is a RAT A, but network load of the RAT A (for example, NR) is already high, and a user priority of the terminal device is low, and in this case, the first network element may determine to select a RAT B (for example, an E-UTRAN) for the terminal device as the radio access information.

S307: The first network element sends first indication information to a third network element, where the first indication information includes the access information selection policy of the terminal device that is determined by the first network element.

Optionally, when the first network element is a core network element, a network management network element, or a service server, the first network element sends first indication information to an access network element or the terminal device, where the first indication information may include the access information selection policy of the terminal device. According to the method, the access network element can trigger, with reference to the access information selection policy, the terminal device to access a corresponding RAT or a corresponding access frequency, where the corresponding RAT is the same as or different from the target RAT, and the corresponding access frequency is the same as or different from the target access frequency. Alternatively, according to the method, the terminal device can access, with reference to the access information selection policy, a corresponding RAT or a corresponding access frequency, where the corresponding RAT is the same as or different from the target RAT, and the corresponding access frequency is the same as or different from the target access frequency.

Optionally, the first network element further sends an applicable condition of the access information selection policy to the access network element or the terminal device, where the applicable condition includes at least one of the following information: the service type, the user type, a user identifier, the time information, and the area information. The applicable condition of the access information selection policy is used to indicate specific conditions in which the access information selection policy is available.

Optionally, the access information selection policy that is of the terminal device and that is sent by the first network element to a third network element may be an RFSP/SPID policy corresponding to the terminal device.

Optionally, the access information selection policy of the terminal device dynamically changes with a scenario. In other words, the first network element dynamically updates the policy to the third network element, for example, updates the policy based on network area information of the terminal device, or updates the policy based on different time segments. Alternatively, the access information selection policy may be a dynamic global policy (a policy and a corresponding applicable condition (time, a place, or the like)), and after the policy is delivered to the third network element, the third network element dynamically executes the policy. In a possible implementation, the first network element may send, at a time, a corresponding RFSP/SPID in only one scenario (time, a place, or the like). If the first network element determines that a scenario of the terminal device subsequently changes, and a corresponding RFSP changes, the first network element may further update the RFSP to a RAN.

In another possible implementation, the first network element may alternatively send, at a time, RFSPs/SPIDs corresponding to the terminal device in a plurality of scenarios (time, places, or the like), and indicate a condition (time, a place, RAN load, or the like) to which each RFSP/SPID is applicable.

S308: The third network element determines and executes a camping policy of the terminal device based on the access information selection policy of the terminal device that is sent by the first network element.

The third network element may be an access network element or a terminal device.

Optionally, the camping policy of the terminal device may be specifically that the terminal device continues to camp on an original RAT or an original access frequency, or may be that the terminal device is transferred to access another RAT or access frequency.

Optionally, when the third network element is an access network element, the policy of transferring the terminal device to access another RAT or access frequency that is executed by the third network element is specifically as follows: After the access network element selects an appropriate target RAT or an appropriate target access frequency for the terminal device based on the first analytics information, if the terminal is in a connected mode, the access network element may hand over, through a handover procedure, the terminal device to a target cell corresponding to the target RAT or the target access frequency. Alternatively, the access network element may send a related target RAT or a related target access frequency to the terminal device through a redirection procedure, so that after entering an idle mode, the terminal device can choose to access a cell corresponding to the target RAT or the target access frequency. For another example, after the access network element selects an appropriate target RAT or an appropriate target access frequency for the terminal device based on the first analytics information, if the terminal is currently in an idle mode, the access network element may wait until the terminal device enters a connected mode. Alternatively, after the access network pages the terminal device to the connected mode, the access network then enables, by using a handover or redirection method in the connected mode, the terminal device to access a cell corresponding to the target RAT or the target access frequency.

Optionally, when the third network element is the terminal device, a policy of transferring the third network element to access another RAT or another access frequency is specifically as follows: The terminal device performs cell reselection or network reselection, to access a cell corresponding to the another RAT or the another access frequency.

For example, if the terminal device determines, based on the RFSP sent by the first network element, that the current RAT or the current access frequency has the highest priority, the terminal device determines to continue to camp on the current RAT or the current access frequency. If the terminal device determines, based on the RFSP sent by the first network element, that the another RAT or the another access frequency has the highest priority, the terminal device performs cell reselection or network reselection to access the cell corresponding to the another RAT or the another access frequency. Before the terminal device performs cell reselection or network reselection to access the cell corresponding to the another RAT or the another access frequency, if the terminal device is in a connected mode in the current RAT or the current access frequency, the terminal device may wait to enter an idle mode and then perform cell reselection or network reselection to access the cell corresponding to the another RAT or the another access frequency.

S309: The terminal device accesses the target RAT or access frequency according to an indication of the third network element.

It should be understood that, when the third network element is the access network element, this step is performed. If the third network element is the terminal device, the terminal device accesses the target RAT or the access frequency, and may initiate a service in the target RAT or access frequency.

By performing all the foregoing steps, it can be ensured that the terminal device accesses an appropriate RAT or an appropriate access frequency. The RAT or access frequency can just ensure that service experience for the service initiated by the terminal device currently or in the future meets the preset condition, for example, the service experience of the terminal device is optimal.

Optionally, the data analytics network element may directly generate the RAT related information or the access frequency related information based on the data, and the RAT related information or the access frequency related information is included in corresponding information and sent to the first network element. That is, the data analytics network element directly prefers a RAT or an access frequency of the terminal device in a scenario for the first network element. In this manner, the data analytics network element may directly generate the RAT related information or the access frequency related information with reference to the data input in Table 6 and Table 7 in S302, or the data analytics network element may first generate the service experience analytics information in S303 and the service behavior analytics information in S304, and then further generate the RAT related information or the access frequency related information of the terminal device based on the two types of analytics information in S303 and S304.

In the technical solution provided in this embodiment of this application, the data analytics network element can perform statistical analysis on a relationship between service experience information and radio access information, and the data analytics network element can also perform statistical analysis on user-level service behavior information. According to the foregoing two steps, the data analytics network element can assist the first network element in formulating a radio access information selection policy for a single terminal device. The policy is used to select an appropriate camping RAT or an appropriate camping frequency for the terminal device in different scenarios, and the policy is formulated based on a service type that is to be initiated or has been initiated by the terminal device, that is, the service type of the terminal device is considered, and the policy is dynamically variable, so that the service experience of the terminal device can reach the preset condition.

Figure 7:
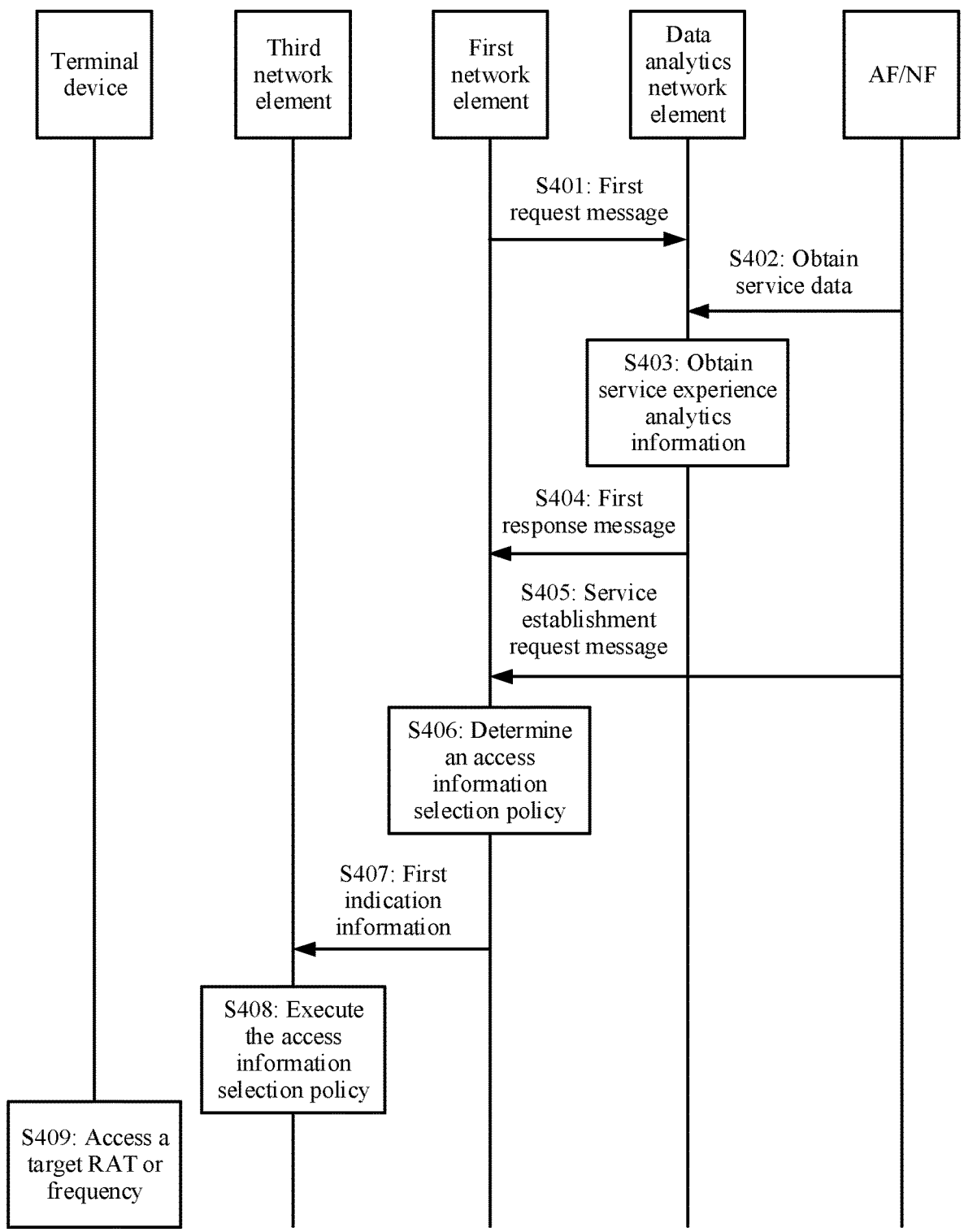
FIG. 7 is a schematic interaction diagram of another policy determining method according to an embodiment of this application.

FIG. 7 is a schematic interaction diagram of another policy determining method according to an embodiment of this application.

The technical solution shown in FIG. 7 is applied to a service type of that is being performed by a terminal device or a service type that is to be initiated by the terminal device, that is, a first network element can determine a service type initiated by the terminal device.

Optionally, after the first network element determines the service type of the terminal device (for example, receives a service establishment request message initiated by an AF for the terminal device), the first network element formulates an access selection policy based on the initiated service type and in combination with first analytics information, and in this way, service experience for the service type in a RAT or an access frequency that is indicated in the policy meets a preset condition. Specific steps are as follows:

S401: The first network element sends a first request message to a data analytics network element.

The first request message is used to obtain the first analytics information from the data analytics network element. Content of the first analytics information is similar to the content of the first analytics information in the embodiment of FIG. 5, and details are not described herein again.

A method for sending, by the first network element, the first request message to the data analytics network element is similar to the method for sending, by the first network element, the first request message to the data analytics network element in the embodiment of FIG. 5, and details are not described herein again.

In a specific implementation, the first request message may carry the second analytics identifier, used to indicate that the first analytics information is requested.

Optionally, the first network element may further include filtering information in the first request message, to identify that the first analytics information corresponding to the filtering information or meeting a filtering condition such as a time filtering condition or a location filtering condition is requested.

Optionally, the first network element may further include a reporting condition in the first request message, to indicate the data analytics network element to feed back the two types of analytics information based on the reporting condition. For example, the reporting condition may be time set by a timer, and is used to indicate the data analytics network element to feed back the first analytics information within a period of time after receiving the first request message, or feed back the first analytics information after the first analytics information meets a preset condition, or periodically report the first analytics information.

S402: The data analytics network element obtains related training data.

It should be understood that, to generate service experience analytics information of the terminal device, training data content obtained by the data analytics network element and an obtaining method are similar to those in S302, and details are not described herein again.

S403: The data analytics network element analyzes and obtains, based on the obtained training data, the service experience analytics information corresponding to the RAT or the access frequency.

It should be understood that, to obtain the service experience analytics information corresponding to the RAT or the access frequency, training data content obtained by the data analytics network element and an obtaining method are similar to those in S303, and details are not described herein again. It should be noted that steps 402 and 403 do not depend on step 401, and there is no time sequence between steps 402 and 403 and step 401. In other words, the data analytics network element may obtain related training data in advance and generate related analytics information, and does not necessarily perform a related operation only after receiving the first request message.

S404: The data analytics network element sends a first response message to the first network element, where the first response message includes the first analytics information.

The first analytics information is a first analytics message corresponding to the first request message in S401.

It should be understood that S404 is similar to S305, and a difference lies in that service behavior analytics information may also need to be obtained in S305, while the service behavior information has been determined herein, and therefore the service behavior analytics information does not need to be obtained.

S405: The first network element obtains a service establishment request message of the terminal device.

Optionally, the first network element receives a service establishment request message initiated by the AF for the terminal device, and the first network element formulates the access selection policy based on the initiated service type and in combination with the first analytics information obtained from the data analytics network element, and in this case, the service experience of the service type in the target RAT or the target access frequency that is indicated in the policy meets the preset condition.

It should be understood that there is no time sequence between step 401 and step 405. In a possible implementation, step 405 may occur after step 401. In another possible implementation, step 405 may alternatively occur before step 401. That is, after a service type occurs on the terminal device, the first network element sends the first request message to the data analytics network element. Preferably, the first request message includes the service type that has occurred, used to request the first analytics information of the corresponding service type.

S406: The first network element obtains the first analytics information, and determines an access information selection policy of the terminal device.

It should be understood that S406 is similar to S306, and a difference lies only in that, in this embodiment, the service type of the terminal device has been determined, and therefore statistical collection or prediction does not need to be performed on the service type of the terminal device.

S407: The first network element sends first indication information to a third network element, where the first indication information includes the access information selection policy of the terminal device that is determined by the first network element.

It should be understood that the first network element sends the first indication information to the third network element. A method for sending the first indication information to the third network element is similar to that in S307, and details are not described herein again.

S408: The third network element determines and executes a camping policy of the terminal device based on the access information selection policy of the terminal device that is sent by the first network element.

It should be understood that a method for determining and executing the camping policy of the terminal device by the third network element is similar to that in S308, and details are not described herein again.

S409: The terminal device accesses the target RAT or access frequency according to an indication of the third network element.

It should be understood that a method for accessing the target RAT or access frequency by the terminal device is similar to that in S309, and details are not described herein again.

In the technical solution provided in this embodiment of this application, the data analytics network element can perform statistical analysis on a relationship between service experience information and radio access information. Based on this, the data analytics network element can assist the first network element in formulating a radio access information selection policy for a single terminal device. The policy is used to select an appropriate camping RAT or an appropriate camping frequency for the terminal device in different scenarios, and the policy is formulated based on a service type that is to be initiated or has been initiated by the terminal device, that is, the service type of the terminal device is considered, and the policy is dynamically variable, so that the service experience of the terminal device can reach the preset condition.

Figure 8:
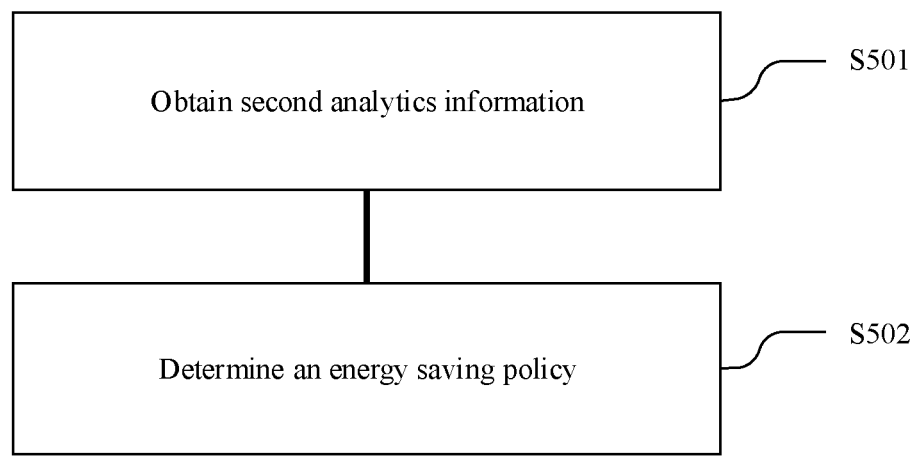
FIG. 8 is a schematic flowchart of another policy determining method according to an embodiment of this application.

FIG. 8 is a schematic flowchart of another policy determining method according to an embodiment of this application.

S501: A second network element obtains second analytics information from a data analytics network element.

It should be understood that the second network element may be a network element having a decision function, and may provide various related policies for a network device or a terminal device, for example, may be an OAM, a network slice management function (NSMF), or a communication service management function (CSMF). The second network element in this embodiment specifically relates to decision-making of a network energy saving policy. The data analytics network element may be a network element that has data collection, training, analysis, and inference functions; and may collect related data from a network function network element, a third-party service server, the terminal device, or a network management system, perform analysis and training based on the related data, and provide data analytics information for the network function network element, the third-party service server, the terminal device, or the network management system. For example, the data analytics network element may be an NWDAF, an MDAS, or the like. The data analytics network element may be an independent network element, may be a combination of a plurality of network elements, or may be integrated with the second network element or another network element.

The second analytics information includes at least one of the following information: RAT related information or access frequency related information, service experience analytics information corresponding to a RAT or an access frequency, and service behavior analytics information.

Optionally, a meaning and content of the RAT related information or the access frequency related information is the same as those of the RAT related information or the access frequency related information in the embodiment of FIG. 7, and details are not described herein again.

Optionally, the service experience analytics information corresponding to the RAT or the access frequency is the same as the foregoing service experience analytics information corresponding to the RAT or the access frequency, and details are not described herein again.

Optionally, the service behavior analytics information may include terminal device-level service behavior analytics information or service behavior analytics information of the terminal device that is aggregated in a network area.

For details of the terminal device-level service behavior analytics information, refer to the terminal device-level service behavior analytics information in the embodiment of FIG. 5, and details are not described herein again. The service behavior analytics information of the terminal device that is aggregated in the network area may include at least one of the following information: time information, area information, a service type, priority information of the service type, an occurrence probability of the service type, duration of the service type, a user quantity corresponding to the service type, and a user quantity proportion of the service type.

Optionally, the service behavior analytics information includes service behavior statistics information or service behavior prediction information.

Optionally, a method in which a second network element obtains second analytics information from a data analytics network element includes: The second network element sends a second request message to the data analytics network element, where the second request message includes at least one piece of area information, and the second request message is used to request to obtain the second analytics information corresponding to the area information; and the second network element receives a second response message sent by the data analytics network element, where the second response message includes the second analytics information. For example, the second request message is used to request the service behavior analytics information in an area A, and/or the service experience analytics information corresponding to the RAT/access frequency in the area A. The service behavior analytics information in the area A may be service behavior analytics information of each terminal device in the area A, or may be service behavior analytics information that is aggregated in the area A. The service experience analytics information corresponding to the RAT/access frequency in the area A may be service experience analytics information of a service type of each terminal device in the area A in the RAT/access frequency, or may be service experience analytics information of the service type in the area A in the RAT/access frequency.

Optionally, a method in which a second network element obtains second analytics information from a data analytics network element includes: The second network element sends a second request message to the data analytics network element, where the second request message includes the service type, and the second request message is used to request to obtain the second analytics information corresponding to the service type; and the second network element receives a second response message sent by the data analytics network element, where the second response message includes the second analytics information. For example, the second request message is used to request the service behavior analytics information corresponding to a service type 1, and/or the service experience analytics information of the service type 1 in the RAT/access frequency. The service behavior analytics information corresponding to the service type 1 may be service behavior analytics information, of each terminal device, that corresponds to the service type 1, or may be aggregated service behavior analytics information corresponding to the service type 1. The service experience analytics information of the service type 1 in the RAT/access frequency may be service experience analytics information of the service type 1 of each terminal device in the RAT/access frequency, or may be service experience analytics information of the service type 1 in the RAT/access frequency.

Optionally, the second network element may be a core network element, a network management network element, an application server, or the like. The core network element includes a control plane network element or a user plane network element.

S502: The second network element determines an energy saving policy of the network area based on the second analytics information.

Optionally, a method in which the second network element determines an energy saving policy of the network area based on the second analytics information includes: The second network element determines a method for enabling or disabling, power consumption control, or load transfer of an access network network element based on the second analytics information, so that energy consumption of the network area meets a preset condition and/or service experience corresponding to the service type meets the preset condition. For example, energy consumption of the network area is less than a first threshold, and/or the service experience corresponding to the service type is optimal or greater than a second threshold.

Enabling or disabling of the access network network element includes enabling or disabling a base station, an access frequency, and a cell, for example, disabling the entire base station or enabling a cell corresponding to 2600 MHz frequency in the base station.

Power consumption control of the access network network element includes increasing or decreasing power or energy consumption corresponding to a base station, an access frequency, and a cell, for example, decreasing power consumption of a 3.5 GHz cell, and increasing power consumption of a 900 MHz cell.

Load transfer of the access network network element includes load transfer between base stations, between access frequencies, and between cells, for example, load transfer of a cell 1 corresponding to NR to a cell 2 corresponding to LTE.

It should be understood that the energy saving policy of the network area may include more than two operation methods such as enabling or disabling, power consumption control, or load transfer of the access network network element. For example, when load of an access network network element is very low, before indicating to disable the access network network element, the energy saving policy may further indicate to first transfer the load of the access network network element to another access network network element.

In a possible implementation, when the second analytics information includes the RAT related information or the access frequency related information, and the RAT related information or the access frequency related information includes the recommended RAT or the recommended access frequency for at least one service type, a method in which the second network element determines an energy saving policy of the network area based on the second analytics information includes: The second network element determines a service type of the network area, where the service type of the network area refers to at least one service type that has been initiated or is to be initiated in the network area; the second network element determines a user quantity or a user quantity proportion of the service type in the network area; and the second network element determines a method for enabling or disabling, power consumption control, or load transfer of an access network network element based on the recommended RAT or the recommended access frequency corresponding to the service type of the network area, and the user quantity or the user quantity proportion of the service type of the network area. For example, the second analytics information includes a recommended RAT or frequency for a service A, a service B, and a service C. If the second network element determines that the service A has occurred or is to occur in the area 1, the second network element determines a method for enabling or disabling, power consumption control, or load transfer of the access network network element based on the recommended RAT or the recommended frequency for the service A, and the user quantity or the user quantity proportion of the service A in the network area.

In a possible implementation, when the second analytics information includes the RAT related information or the access frequency related information, and the RAT related information or the access frequency related information includes a recommended RAT or a recommended access frequency for a terminal device level, a method in which the second network element determines an energy saving policy of the network area based on the second analytics information includes: The second network element determines a recommended RAT or a recommended access frequency corresponding to at least one terminal device in the network area; and the second network element determines a method for enabling or disabling, power consumption control, or load transfer of the access network network element based on the recommended RAT or the recommended access frequency corresponding to the at least one terminal device in the network area. For example, if the second analytics information includes a recommended RAT or a recommended frequency for each terminal device in the area 1, the second network element determines the method for enabling or disabling, power consumption control, or load transfer of the access network network element based on the recommended RAT or the recommended frequency for each terminal device. Specifically, the second network element collects statistics about a demand for resources of each RAT or access frequency based on a recommended RAT or a recommended frequency for each terminal device, and then determines, based on the demand for resources of each RAT or access frequency, how to perform enabling or disabling, power consumption control, or transfer load of the access network network element.

In a possible implementation, when the second analytics information includes the RAT related information or the access frequency related information, and the RAT related information or the access frequency related information includes a recommended RAT or a recommended access frequency for a terminal device-level service type, a method in which the second network element determines an energy saving policy of the network area based on the second analytics information includes: The second network element determines a service type that has been initiated or is to be initiated by the terminal device in the network area; the second network element determines a recommended RAT or a recommended access frequency corresponding to the service type that has been initiated or is to be initiated by the terminal device; and the second network element determines a method for enabling or disabling, power consumption control, or load transfer of the access network network element based on the recommended RAT or the recommended access frequency corresponding to the service type that has been initiated or is to be initiated by the terminal device. For example, if the second analytics information includes a recommended RAT or a recommended frequency for each service type of each terminal device in the area 1, the second network element determines the method for enabling or disabling, power consumption control, or load transfer of the access network network element based on the recommended RAT or the recommended frequency for each service type of each terminal device. Specifically, as shown in Table 10A and Table 10B below, the second network element collects statistics about a demand for resources of each RAT or access frequency based on the recommended RAT or the recommended frequency for each service type of each terminal device, to determine how to perform enabling or disabling, power consumption control, or transfer load of the access network network element.

TABLE 10A

| Terminal device and service type | Recommended RAT or access frequency | Resource requirement of a service of the terminal device in the RAT or the access frequency |
|---|---|---|
| Service A of a terminal device A | NR/3.5 GHz | Two units |
| Service B of the terminal device A | NR/2.6 GHz | Three units |
| Service C of the terminal device A | eLTE/900 MHz | One unit |
| Service A of a terminal device B | NR/3.5 GHz | Three units |
| Service B of the terminal device B | LTE/700 MHz | Two units |
| Service A of a terminal device C | NR/3.5 GHz | Four units |
| Service B of the terminal device C | eLTE/900 MHz | One unit |

TABLE 10B

| RAT/frequency | Collect statistics about a total demand for resources of the RAT/ frequency in the area |
|---|---|
| NR/3.5 GHz | Nine units |
| NR/2.6 GHz | Three units |
| eLTE/900 MHz | Two units |
| LTE/700 MHz | Two units |

In a possible implementation, when the second analytics information includes the service experience analytics information corresponding to the RAT or the access frequency, and the service experience analytics information corresponding to the RAT or the access frequency includes corresponding service experience for at least one service type in the RAT or the access frequency, a method in which the second network element determines an energy saving policy of the network area based on the second analytics information includes: The second network element determines a service type of the network area, where the service type of the network area refers to at least one service type that has been initiated or is to be initiated in the network area; for the service type of the network area, the second network element determines a target RAT or a target access frequency in the service experience analytics information corresponding to the RAT or the access frequency, so that the service experience, in the target RAT or the target access frequency, that corresponds to the service type of the network area can meet the preset condition; the second network element determines the user quantity or the user quantity proportion of the service type of the network area; and the second network element determines a method for enabling or disabling, power consumption control, or load transfer of the access network network element based on the user quantity or the user quantity proportion of the service type of the network area, and the target RAT or the target access frequency corresponding to the service type of the network area. As shown in Table 11A and Table 11B below, for example, the second analytics information includes corresponding service experience for a service A, a service B, and a service C in the RAT or the access frequency. If the second network element determines that the service A has occurred or is to occur in an area 1, the second network element determines the target RAT or the target access frequency based on the service experience corresponding to the service A in the RAT or the access frequency, so that the service experience corresponding to the service A in the network area in the target RAT or the target access frequency can meet the preset condition. The second network element determines a user quantity or a user quantity proportion of the service A in the network area. The second network element determines a method for enabling or disabling, power consumption control, or load transfer of the access network network element based on the user quantity or the user quantity proportion of the service A in the network area, and the target RAT or the target access frequency corresponding to the service A in the network area. Similarly, if there is more than one service type in the area 1, for each service type, by using the foregoing same method, the second network element may determine a target RAT or access frequency corresponding to each service type and a user quantity or a user quantity proportion that corresponds to each service type. Then, the second network element collects statistics about a demand for resources of each RAT or access frequency based on the user quantity or the user quantity proportion that corresponds to each service type in the network area and the target RAT or access frequency corresponding to each service type, to determine how to perform enabling or disabling, power consumption control, or transfer load of the access network network element.

TABLE 11B

| RAT/frequency | Collect statistics about a total demand for resources of the RAT/ frequency in the area |
|---|---|
| NR/3.5 GHz | 500 units |
| eLTE/900 MHz | 400 units |

In a possible implementation, when the second analytics information includes the service experience analytics information corresponding to the RAT or the access frequency, and the service experience analytics information corresponding to the RAT or the access frequency includes corresponding service experience for a terminal device-level service type in the RAT or the access frequency, a method in which the second network element determines an energy saving policy of the network area based on the second analytics information includes: The second network element determines a service type that has been initiated or is to be initiated by the terminal device in the network area; for the service type that has been initiated or is to be initiated by the terminal device, the second network element determines the target RAT or the target access frequency in the service experience analytics information corresponding to the RAT or the access frequency, so that corresponding service experience for the service type that is in the target RAT or the target access frequency and that has been initiated or is to be initiated by the terminal device can meet the preset condition; and the second network element determines the method for enabling or disabling, power consumption control, or load transfer of the access network network element based on the service type that has been initiated or is to be initiated by the terminal device and the target RAT or the target access frequency corresponding to the service type that has been initiated or is to be initiated by the single terminal device. As shown in Table 12A and Table 12B below, for example, if the second analytics information includes corresponding service experience for each terminal device in the area 1 in the RAT or the access frequency, the second network element determines the target RAT or the target access frequency for corresponding service experience for a service that has occurred or is to occur of each terminal device in the RAT or the access frequency, so that the corresponding service experience for the service type that is in the target RAT or the target access frequency and that has been initiated or is to be initiated by each terminal device can meet the preset condition. Then, the second network element determines the method for enabling or disabling, power consumption control, or load transfer of the access network network element based on the service type that has

TABLE 11A

| Service type | RAT or access frequency | Service experience | User quantity | Target RAT or access frequency | Resource requirement of a service of a single terminal device in the RAT or the access frequency |
|---|---|---|---|---|---|
| Service A | NR/3.5 GHz | 2.8 | 200 | eLTE/900 MHz | 2 |
| Service A | NR/2.6 GHz | 3 | | | |
| Service A | eLTE/900 MHz | 4.5 | | | |
| Service B | NR/3.5 GHz | 4 | 100 | NR/3.5 GHz | 3 |
| Service B | LTE/700 MHz | 3 | | | |
| Service C | NR/3.5 GHz | 4.5 | 50 | NR/3.5 GHz | 4 |
| Service C | eLTE/900 MHz | 4.2 | | | | been initiated or is to be initiated by each terminal device and the target RAT or the target access frequency corresponding to the service type that has been initiated or is to be initiated by each terminal device. Specifically, the second network element collects statistics about a demand for resources of each RAT or access frequency based on the service type that has been initiated or is to be initiated by each terminal device and the target RAT or the target access frequency corresponding to the service type that has been initiated or is to be initiated by each terminal device, to determine how to perform enabling or disabling, power consumption control, or transfer load of the access network network element.

TABLE 12A

| Terminal device | Recommended RAT or access frequency | Service experience | Target RAT or access frequency | Resource requirement of the terminal device in the RAT or the access frequency |
|---|---|---|---|---|
| Service A of a terminal device A | NR/3.5 GHz | 4.5 | NR/3.5 GHz | Two units |
| Service A of the terminal device A | NR/2.6 GHz | 4 | | |
| Service B of the terminal device A | eLTE/900 MHz | 3 | eLTE/900 MHz | One unit |
| Service A of a terminal device B | NR/3.5 GHz | 3.5 | NR/3.5 GHz | Three units |
| Service A of the terminal device B | LTE/700 MHz | 2 | | |
| Service A of a terminal device C | NR/3.5 GHz | 4.5 | NR/3.5 GHz | Four units |
| Service D of the terminal device C | eLTE/900 MHz | 3.5 | eLTE/900 MHz | One unit |

TABLE 12B

| RAT/frequency | Collect statistics about a total demand for resources of the RAT/frequency in the area |
|---|---|
| NR/3.5 GHz | Nine units |
| eLTE/900 MHz | Two units |

Optionally, the second analytics information further includes service behavior analytics information, the service behavior analytics information includes service behavior analytics information of the terminal device that is aggregated in the network area; and a method in which the second network element determines a service type of the network area includes: The second network element determines the service type of the network area based on the service behavior analytics information of the terminal device that is aggregated in the network area.

Optionally, the second analytics information further includes service behavior analytics information, the service behavior analytics information includes terminal device-level service behavior analytics information, and a method in which the second network element determines a service type that has been initiated or is to be initiated by the terminal device in the network area includes: The second network element determines, based on the terminal device-level service behavior analytics information, the service type that has been initiated or is to be initiated by the terminal device in the network area.

Optionally, the second network element determines the energy saving policy of the network area based on the second analytics information and second information, where the second information includes: priority information of the service type in the network area, charging policy information of the service type in the network area, a user type of the terminal device in the network area, a user quantity in a connected state in the network area, a user quantity in an idle state in the network area, a demand for resources in the network area, and power consumption in the network area. The demand for resources in the network area may be an overall demand for resources in the network area or a demand for resources at a service type level. The power consumption in the network area is overall power consumption in the network area or power consumption at a service type level. The second information may be from the second network element or from another network element, for example, an NWDAF.

For example, if the second network element determines, based on the second analytics information, that NR resources in the network area are insufficient to support all service types in the area, but the NR resources can support a high-priority service type A, the energy saving policy generated by the second network element indicates that another NR base station or cell does not need to be enabled.

For another example, if the second network element determines, based on the second analytics information, that a demand for NR resources in the network area is low and an NR cell needs to be disabled, but there are some gold users in the cell, the energy saving policy generated by the second network element indicates that the NR cell cannot be disabled.

Optionally, the second response message may further include an applicable condition of the second analytics information, where the applicable condition of the second analytics information includes at least one of the following information: the service type, the user type, a user identifier, the time information, and the area information. The applicable condition of the second analytics information is used to indicate specific conditions in which the second information is available.

It should be understood that, for different analytics information in the second analytics information, there may be different applicable conditions. For example, the service experience analytics information corresponding to the RAT or the access frequency corresponds to an applicable condition 1, and the service behavior analytics information corresponds to an applicable condition 2.

Optionally, when the second network element is a core network element or a network management network element, the method further includes: The second network element sends the energy saving policy of the network area to the access network element, or the second network element sends the energy saving policy of the network area to a network management execution network element. That the second network element sends the energy saving policy of the network area to the access network element is used by the access network element to perform an enabling or disabling operation, a power consumption control operation, or a load transfer operation of the access network network element with reference to the energy saving policy, to achieve an objective of saving energy consumption of an access network while ensuring the service experience in the network area. Similarly, that the second network element sends the energy saving policy of the network area to the network management execution network element is used by the network management execution network element to perform an enabling or disabling operation, a power consumption control operation, or a load transfer operation of the access network network element with reference to the energy saving policy, to achieve an objective of saving energy consumption of the access network while ensuring the service experience in the network area.

Optionally, the applicable condition, of the energy saving policy of the network area, that is sent by the second network element to the access network element or the network management execution network element includes at least one of the following information: the service type, the user type, the user identifier, the time information, and the area information.

Optionally, when the second network element is an access network element, the method further includes: The second network element executes the energy saving policy of the network area, that is, performs the method for enabling or disabling, power consumption control, or load transfer of the access network network element. In other words, after obtaining the second analytics information from the data analytics network element, the access network element generates the energy saving policy of the network area with reference to the second analytics information, and executes the energy saving policy.

Figure 9:
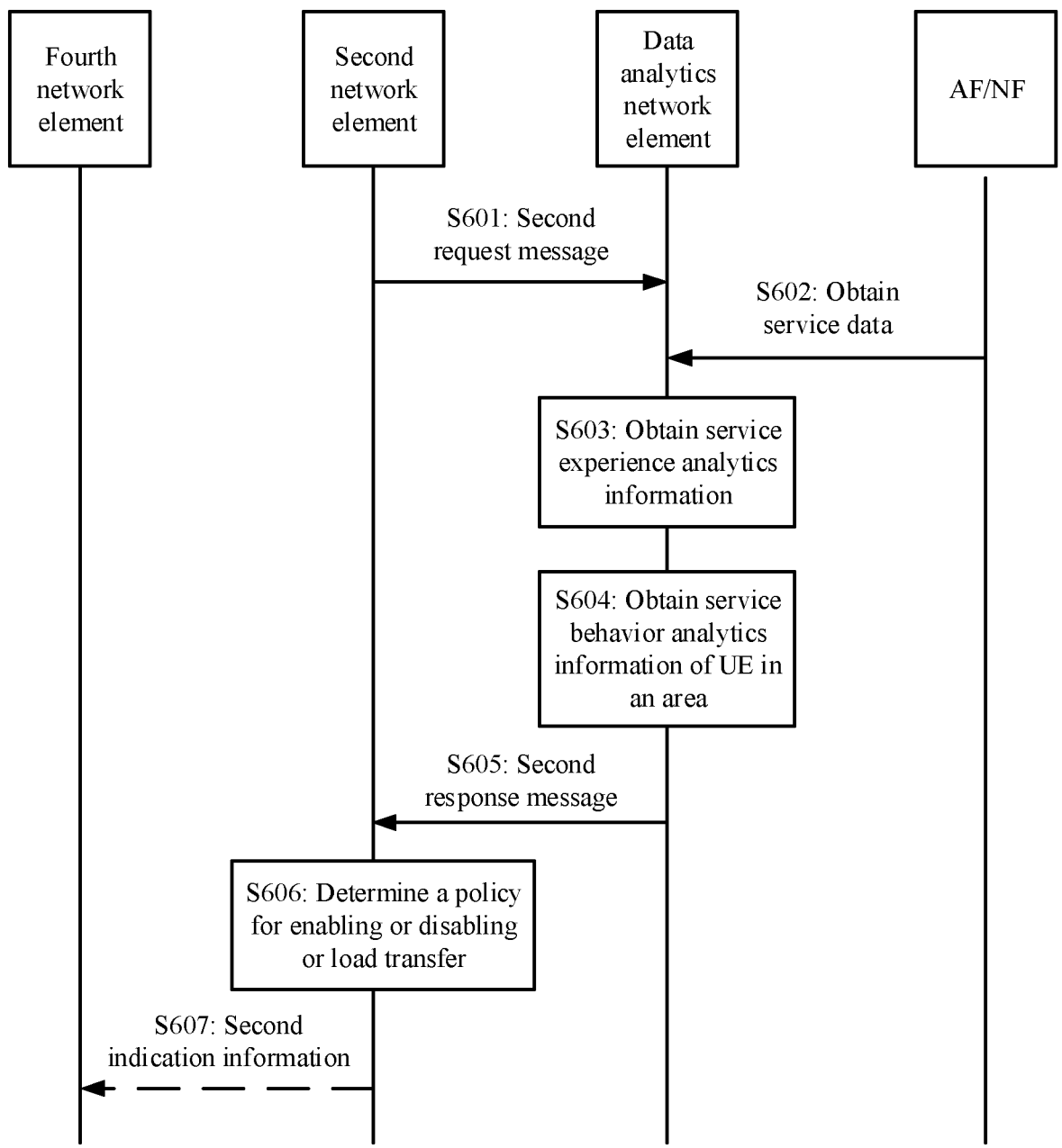
FIG. 9 is a schematic interaction diagram of still another policy determining method according to an embodiment of this application.

FIG. 9 is a schematic interaction diagram of still another policy determining method according to an embodiment of this application.

S601: A second network element sends a second request message to a data analytics network element.

It should be understood that a second network element sends a second request message to a data analytics network element is similar to the method in S501, and details are not described herein again.

S602: The data analytics network element obtains training data.

Optionally, to analyze a service behavior of a terminal device in an area, the training data collected by the data analytics network element is similar to that in Table 6. A difference lies in that the training data collected herein is information obtained for all terminal devices or a plurality of terminal devices in the area, and is not information obtained only for a single terminal device.

Optionally, to analyze service experience based on radio access information, service data collected by the data analytics network element is the same as that in Table 7. It should be noted that the service data collected herein is also information obtained for all the terminal devices or the plurality of terminal devices in the area.

S603: The data analytics network element analyzes and obtains, based on the obtained training data, service experience analytics information corresponding to a RAT or an access frequency.

It should be understood that the method in which the data analytics network element analyzes and obtains the service experience analytics information corresponding to the RAT or the access frequency is the same as the foregoing obtaining method, and details are not described herein again.

S604: The data analytics network element analyzes and obtains service behavior analytics information based on the obtained training data.

Herein, the service behavior analytics information refers to data analytics information that can reflect service usage or a rule of one or more terminal devices (for example, terminal devices of a same priority or a gold-only terminal device group) or all terminal devices in the entire network or a network area.

Optionally, the service behavior analytics information of the terminal device may include terminal device-level service behavior analytics information or service behavior analytics information of the terminal device that is aggregated in a network area.

Optionally, the terminal device-level service behavior analytics information may include at least one of an identifier, time information, area information, a service type, priority information of the service type, an occurrence probability of the service type, and duration of the service type of the terminal device. The service type may be one or more service types, and for the terminal device-level service behavior analytics information, refer to the example shown in Table 9.

Optionally, the service behavior analytics information of the terminal device that is aggregated in the network area may include: at least one of the service type in the network or the area, a user quantity corresponding to the service type, a user quantity proportion corresponding to the service type, a service occurrence location, service initiation time, service lasting time, the occurrence probability of the service type, and service priority information. The service type may be one or more service types, and for the terminal device-level service behavior analytics information that is aggregated in the network area, refer to the example shown in Table 13.

TABLE 13

| Analytics information | Description |
| --- | --- |
| Area information (location area) | Used to identify an area, where the area may be a network area (for example, a cell ID) or a geographical area (for example, Shanghai Pudong New Area) |
| >Time | Time stamp (for example, 08:00:00) or time segment (for example, 08:00 to 08:10) |

TABLE 13-continued

| Analytics information | Description |
|---|---|
| >Service behavior analytics data | Service behavior analytics data |
| >>Information about a service identifier | Used to uniquely identify a service, for example, an app ID |
| >>A service user quantity or proportion | Quantity of users who use the service or the proportion of the quantity of users who use the service to the total quantity of users, for example, 200/60% |
| >>Service duration | Average service duration, for example, 20 minutes |
| >>Recommended RAT or recommended access frequency | Recommended RAT or access frequency for the service, for example, recommended 5G NR or recommended 2.6 GHz |
| >>Service resource requirement (radio resource requirement) | Indicate a network resource requirement of the service. For example, a resource requirement of an access network is two units per user |
| >>Service priority | High level |
| >>Service energy consumption | Indicate energy consumption of a service. For example, power consumption is 200 joules per second |
| . . . | . . . |

It should be understood that each piece of information in the foregoing table is not necessarily mandatory. For example, the area information is optional. When there is no area information, Table 12 shows service behavior analytics information of the terminal device in the entire network.

Optionally, the service behavior analytics information includes service behavior statistics information or service behavior prediction information.

Optionally, a method in which the data analytics network element determines the service behavior prediction information of the terminal device is the same as the foregoing obtaining method, and details are not described herein again.

It should be understood that there is no time sequence between S601 and S602 to S604. This embodiment is merely used as an example for description, and does not limit a sequence of S601 and S602 to S604.

S605: The data analytics network element sends a second response message to the second network element, where the second response message may include second analytics information.

The second analytics information is an analytics message corresponding to the second request message in S601.

Optionally, the second analytics information includes at least one of the following information: RAT or access frequency information, the service experience analytics information corresponding to the RAT or access frequency, and the service behavior analytics information.

It should be understood that the second network element may receive the second analytics information for a plurality of times, where each piece of the second analytics information may include one of the RAT or access frequency information, the service experience analytics information corresponding to the RAT or access frequency, or the service behavior analytics information.

Optionally, the second response message may further include an applicable condition of the second analytics information, where the applicable condition of the second analytics information includes at least one of the following information: the service type, a user type, a user identifier, the time information, and the area information. The applicable condition of the second analytics information is used to indicate specific conditions in which the second information is available.

It should be understood that, for different analytics information in the second analytics information, there may be different applicable conditions. For example, the service experience analytics information corresponding to the RAT or the access frequency corresponds to an applicable condition 1, and the service behavior analytics information corresponds to an applicable condition 2.

S606: The second network element determines an energy saving policy of the network area based on the second analytics information.

It should be understood that the second network element determines an energy saving policy of the network area based on the second analytics information is similar to the method in S502, and details are not described herein again.

In a possible implementation, the second network element determines, based on the service behavior analytics information of the terminal device in the area, the user quantity or the user proportion (the proportion of the quantity of users who use the service to the total quantity of users in the area) of the service type in the area, and determines, based on the service experience analytics information that is based on the radio access information, the RAT or the access frequency by using which service experience for the service type can meet a preset condition, for example, may be the RAT or the access frequency by using which optimal service experience can be achieved. Based on the obtained information and in combination with the requirement of the service for network device resources or the energy consumption information of the service, the second network element can determine the RAT/frequency type required by the service type in the area and a quantity of used resources of the service type.

Similarly, for another service type that occurs in the area, the second network element may determine, by using the same method, a RAT or an access frequency type required by the another service type and a quantity of used resources of the another service type. Finally, for the area, the second network element may collect and calculate a demand for resources of each RAT or each frequency, for example, a demand for resources of NR/2.6 GHz in the area, to determine whether a corresponding RAT or access frequency can be disabled or needs to be enabled, or determine whether load of a RAT or an access frequency needs to be transferred to another RAT or access frequency, or determine whether power consumption corresponding to a RAT or an access frequency needs to be increased or reduced.

For example, the second analytics information obtained by the second network element from the data analytics network element is shown in Table 14.

TABLE 14

| Analytics information | Example |
|---|---|
| Area information | Cell 1 |
| Time | 08:00 to 08:10 |
| >Information about a service 1 identifier | Augmented reality (AR)/virtual reality (VR) |
| >>RAT corresponding to a service 1 | NR |
| >>Quantity of terminal devices | 100 |
| >>Demand for network device resources by the service 1 | 50 NR units |
| >Information about a service 2 identifier | Network video |
| >>RAT corresponding to a service 2 | NR or eLTE |
| >>Quantity of terminal devices | 40 and 20 |
| >>Demand for resources by the service 2 | 30 NR units and 20 eLTE units |
| >Information about a service 3 identifier | Voice over long term evolution (VoLTE) |
| >>RAT corresponding to a service 3 | LTE |
| >>Quantity of terminal devices | 200 |
| >>Demand for network device resources by the service 3 | 100 LTE units |
| Total demand for resources | 80 NR units, 20 eLTE units, and 100 LTE units |

Assuming that there are 100 NR network device units, 50 eLTE units, and 90 LTE units in a current network area, according to analysis of the foregoing demand for network device resources, in a recommended implementation, the second network element may indicate a network management execution unit or an access network element to disable 20 redundant NR units to reduce energy consumption. In addition, the second network element may indicate the network management execution unit or the access network element to schedule 10 eLTE units to balance load of the LTE units, for example, convert the eLTE units into LTE units by using an air interface virtualization technology. Alternatively, the second network element indicates an LTE base station to transfer an overloaded terminal device to the eLTE base station. For example, the LTE base station may transfer an access terminal device to the eLTE base station through redirection, handover, or the like. Before the redundant NR units are disabled, if the terminal device is not just distributed in only 80 NR units but is distributed in more than 80 NR units, but load of some NR units is very low, preferably, the second network element may further first centralize the terminal device into the actually required 80 NR units by using a load transfer method, and then disable the redundant NR units.

In another possible implementation of this embodiment, the data analytics network element sends the terminal device-level service behavior analytics information (as shown in Table 6) instead of the service behavior analytics information of the terminal device that is aggregated in the area shown in Table 12 to the second network element. In this case, the second network element itself performs data analysis, to obtain an intermediate result 1: the service behavior analytics information of the terminal device that is aggregated in the area (as shown in Table 12). Similarly, the service experience analytics information that corresponds to the RAT or the access frequency and that is sent by the data analytics network element to the second network element may also be based on a terminal device level instead of a service type level. In this way, the second network element performs further analysis to obtain an intermediate result 2: service experience analytics information corresponding to a service type-level RAT or a service type-level access frequency. Finally, the second network element generates an energy saving policy of the network area with reference to the foregoing two intermediate results generated by the second network element itself.

In another possible implementation, the data analytics network element sends, to the second network element, service experience corresponding to the terminal device-level RAT or the terminal device-level access frequency and the terminal device-level service behavior analytics information. The second network element may also directly generate the energy saving policy of the network area without generating an intermediate result.

It should be understood that, when determining the energy saving policy, the second network element ensures that a quantity or load of terminal devices in NR or in an NR high frequency is as small as possible based on the service behavior and the service experience of the terminal device in the network area. In this way, the NR or the NR high frequency is disabled as much as possible to reduce energy consumption, and the service experience of the terminal device in the area is not affected.

S607: The second network element sends the determined energy saving policy of the network area to a fourth network element for executing.

It should be understood that the second network element sends the determined energy saving policy of the network area to a fourth network element is similar to the method described in S502, and is not further described herein.

This application further provides a method for determining a service type. The method may include the following steps.

S701: A data analytics network element receives a third request message, where the third request message is used to request service behavior analytics information.

The service behavior analytics information includes terminal device-level service behavior analytics information or service behavior analytics information of a terminal device that is aggregated in a network area.

Optionally, the service behavior analytics information includes at least one of the following information: an identifier, time information, area information, a service type, priority information of the service type, an occurrence probability of the service type, duration of the service type, a user quantity corresponding to the service type, and a user quantity proportion of the service type of the terminal device.

Optionally, the service behavior analytics information includes service behavior statistics information or service behavior prediction information. Optionally, the third request message includes the identifier of the terminal device, and the third request message is used to request service behavior analytics information corresponding to the identifier of the terminal device.

Optionally, the third request message includes the service type, and the third request message is used to request service behavior analytics information corresponding to the service type.

Optionally, the third request message includes the area information, and the third request message is used to request service behavior analytics information corresponding to the area information.

For details of the service behavior analytics information in this embodiment, refer to the service behavior analytics information in the embodiment of FIG. 6.

S702: The data analytics network element sends a third response message, where the third response message includes the service behavior analytics information.

Optionally, when the service behavior analytics information is terminal device-level service behavior prediction information, the method further includes: The data analytics network element determines service behavior prediction information of a single terminal device.

Optionally, a method in which the data analytics network element determines service behavior prediction information of a single terminal device includes: The data analytics network element determines user profile persona classification information to which the single terminal device belongs; and the data analytics network element predicts service behavior information of the single terminal device based on the user profile persona classification information to which the single terminal device belongs and service behavior information of a terminal device of a same profile persona type. For example, if the data analytics network element determines that a terminal device 1 belongs to $K^{th}$ type of terminal devices, and the data analytics network element learns that a terminal device 2 in the $K^{th}$ type of terminal devices has initiated or is to initiate a service A, the data analytics network element predicts that the service A is also to occur on the terminal device 1. Further, the data analytics network element further predicts, based on a scenario in which the terminal device 2 initiates the service A, a scenario in which the terminal device 1 initiates the service A. For example, if the terminal device 2 initiates the service A at 10 o'clock on Monday, the terminal device 1 may also initiate the service A at 10 o'clock on Monday or other related time.

Optionally, a method in which the data analytics network element determines user profile persona classification information to which the single terminal device belongs includes: The data analytics network element collects terminal device-level network behavior data, terminal device-level service behavior data, and terminal device-level service attribute data. The network behavior data may include subscription information or charging information of the terminal device, for example, an age, a gender, an occupation, an address, a subscribed service type, and a charging mode; the service behavior data may include service initiation time, a service initiation probability, duration, end time, service traffic, a delay, a packet loss, and the like; and the service attribute data may include a social type, a commercial type, a video type, a game type, an MBB type, a URLLC type, and the like. The data analytics network element determines a user profile persona classification model based on the terminal device-level network behavior data, the terminal device-level service behavior data, and terminal device-level historical service attribute data; and the data analytics network element determines, based on the user profile persona classification model, and network behavior data, service behavior data, and service attribute data of the single terminal device, user profile persona classification information to which the terminal device belongs. The user profile persona classification model may also be a user profile persona feature. For example, the data analytics network element determines the profile persona classification information of the single terminal device by calculating a Euclidean distance between the data feature of the single terminal device and the user profile persona feature.

Optionally, the third response message further includes an applicable condition of the service behavior analytics information, where the applicable condition includes at least one of the following information: the service type, a user type, a user identifier, the time information, and location information.

This application further provides a method for determining service experience analytics information. The method may include the following steps.

S801: A data analytics network element receives a fourth request message, where the fourth request message is used to request service experience analytics information corresponding to a RAT or an access frequency.

Optionally, the service experience analytics information corresponding to the RAT or the access frequency includes at least one of the following information: an identifier, a service type, the RAT or the access frequency, service experience for the service type, time information, and area information of a terminal device.

Optionally, the service experience analytics information corresponding to the RAT or the access frequency may be used to indicate service experience corresponding to at least one service type in the RAT or the access frequency. For example, a mean opinion score (MOS) of a voice service in NR/3.5 GHz is 3, and the MOS of the voice service in LTE/700 MHz is 4.5. The service experience analytics information corresponding to the RAT or the access frequency may be further used to indicate service experience corresponding to at least one service type of at least one terminal device in the RAT or the access frequency. For example, a mean opinion score (MOS) of a voice service of a specific terminal device in NR/3.5 GHz is 3.5, and the MOS of the voice service, of the terminal device, in LTE/700 MHz is 4.

In this application, the service experience is represented by an MOS or others, for example, a delay, smoothness, a throughput, a packet loss rate, or a jitter. Alternatively, the service experience may be represented by a combination of a plurality of experience parameters, for example, experience of a combination of a delay and smoothness. This is not limited herein.

Optionally, the fourth request message includes the service type, and the fourth request message is used to request service experience analytics information corresponding to the RAT or the access frequency corresponding to the service type.

Optionally, the fourth request message includes the identifier of the terminal device, and the fourth request message is used to request service experience analytics information corresponding to the RAT or the access frequency corresponding to the identifier of the terminal device.

For details of the service experience analytics information corresponding to the RAT or the access frequency in this embodiment, refer to the service experience analytics information corresponding to the RAT or the access frequency in the embodiment of FIG. 6. For details of the method for sending the fourth request message in this embodiment, refer to the method for sending the first request message in the embodiment of FIG. 6.

S802: The data analytics network element sends a fourth response message, where the fourth response message includes the service experience analytics information corresponding to the RAT or the access frequency.

Optionally, the data analytics network element obtains network data and service data, where the network data includes at least one of the following information: the identifier, the time information, the area information, and the RAT or the access frequency of the terminal device; and the service data includes at least one of the following information: the identifier, the service type, and the service experience of the terminal device. The data analytics network element determines, based on the network data and the service data, the service experience analytics information corresponding to the RAT or the access frequency.

Optionally, the area information may be a cell identifier of the terminal device, and the data analytics network element may obtain the cell identifier from a mobility management network element. The data analytics network element obtains, based on the cell identifier, the RAT or the access frequency corresponding to the cell identifier, or the data analytics network element configures the RAT or the access frequency corresponding to the cell identifier.

Optionally, the fourth response message further includes an applicable condition of the service experience analytics information corresponding to the RAT or the access frequency, where the applicable condition includes at least one of the following information: the service type, a user type, a user identifier, the time information, and location information.

For details of the fourth response message in this embodiment, refer to the first response message in the embodiment of FIG. 6.

Figure 10:
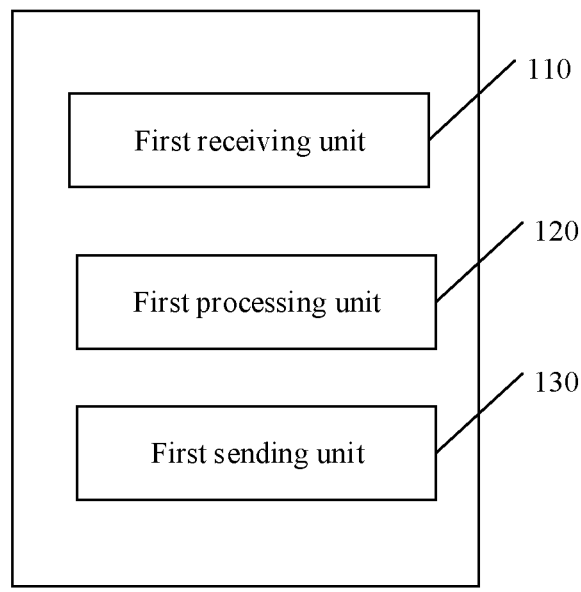
FIG. 10 is a schematic diagram of a communication apparatus according to an embodiment of this application.

FIG. 10 is a schematic diagram of a communication apparatus according to an embodiment of this application.

As shown in FIG. 10, the communication apparatus may include a first receiving unit 110 and a first processing unit 120.

The first receiving unit 110 may be configured to obtain first analytics information from a data analytics network element, where the first analytics information includes at least one of the following information: radio access type RAT related information or access frequency related information, and service experience analytics information corresponding to a RAT or an access frequency. The first processing unit 120 may be configured to determine an access information selection policy of a terminal device based on the first analytics information, where the access information selection policy includes a target RAT or a target access frequency corresponding to the terminal device.

Optionally, the RAT related information or the access frequency related information includes at least one of the following information: an identifier, a service type, a recommended RAT or a recommended access frequency, time information, and area information of the terminal device.

Optionally, the service experience analytics information corresponding to the RAT or the access frequency includes at least one of the following information: the identifier, the service type, the RAT or the access frequency, service experience for the service type, the time information, and the area information of the terminal device.

Optionally, that the first processing unit 120 determines an access information selection policy of a terminal device based on the first analytics information may include: The first processing unit 120 determines, based on the first analytics information, the target RAT or the target access frequency corresponding to the terminal device, where service experience for the service type of the terminal device in the target RAT or the target access frequency meets a preset condition.

Optionally, when the first analytics information is the RAT related information or the access frequency related information, and the RAT related information or the access frequency related information includes the recommended RAT or the recommended access frequency for the terminal device, that the first processing unit 120 determines an access information selection policy of a terminal device based on the first analytics information may include: The first processing unit 120 determines the recommended RAT or the recommended access frequency for the terminal device as the target RAT or the target access frequency corresponding to the terminal device.

Optionally, when the first analytics information is the RAT related information or the access frequency related information, and the RAT related information or the access frequency related information the recommended RAT or the recommended access frequency for at least one service type, that the first processing unit 120 determines an access information selection policy of a terminal device based on the first analytics information may include: The first processing unit 120 determines a service type that has been initiated or is to be initiated by the terminal device; and the first processing unit determines a recommended RAT or a recommended access frequency corresponding to the service type that has been initiated or is to be initiated by the terminal device as the target RAT or the target access frequency corresponding to the terminal device.

When the first analytics information is the service experience analytics information corresponding to the RAT or the access frequency, and the service experience analytics information corresponding to the RAT or the access frequency includes corresponding service experience for at least one service type in the RAT or the access frequency, that the first processing unit 120 determines an access information selection policy of a terminal device based on the first analytics information may include: The first processing unit 120 determines a service type that has been initiated or is to be initiated by the terminal device; and for the service type that has been initiated or is to be initiated by the terminal device, the first processing unit determines the target RAT or the target access frequency in the service experience analytics information corresponding to the RAT or the access frequency, where corresponding service experience for the service type that is in the target RAT or the target access frequency and that has been initiated or is to be initiated by the terminal device meets the preset condition.

Optionally, that the first processing unit 120 determines a service type that is to be initiated by the terminal device may include: The first receiving unit obtains service behavior analytics information of the terminal device that is sent by the data analytics network element; and the first processing unit predicts, based on the service behavior analytics information of the terminal device, the service type that is to be initiated by the terminal device.

Optionally, the service behavior analytics information of the terminal device includes service behavior statistics information of the terminal device or service behavior prediction information of the terminal device.

Optionally, the first communication apparatus may further include a first sending unit 130.

The first sending unit 130 may be configured to send a first request message to the data analytics network element, where the first request message includes the service type, and the first request message is used to request the first analytics information corresponding to the service type; and the first receiving unit is further configured to receive a first response message sent by the data analytics network element, where the first response message includes the first analytics information corresponding to the service type.

The first sending unit 130 may be further configured to send a first request message to the data analytics network element, where the first request message includes the identifier of the terminal device, and the first request message is used to request the first analytics information corresponding to the terminal device; and the first receiving unit is further configured to receive a first response message sent by the data analytics network element, where the first response message includes the first analytics information corresponding to the terminal device.

Optionally, the first receiving unit 110 is further configured to obtain an applicable condition of the first analytics information, where the applicable condition includes at least one of the following information: the service type, a user type, a user identifier, the time information, and the area information.

Optionally, when the first communication apparatus is a core network element or a network management network element, the first sending unit 130 is further configured to send the access information selection policy of the terminal device to an access network element; or the first sending unit 130 is further configured to send the access information selection policy of the terminal device to the terminal device.

Optionally, when the first communication apparatus is an access network element, the first processing unit 120 is further configured to trigger, with reference to the access information selection policy of the terminal device, the terminal device to access the target RAT or the target access frequency.

Optionally, the first sending unit 130 is further configured to send an applicable condition of the access information selection policy to the access network element or the terminal device, where the applicable condition includes at least one of the following information: the service type, a user type, a user identifier, the time information, and the area information.

Optionally, that the first processing unit 120 determines an access information selection policy of a terminal device based on the first analytics information includes: The first processing unit 120 determines the access selection policy based on the first analytics information and first information, where the first information includes at least one of the following information: priority information of the service type, charging policy information of the service type, the user type of the terminal device, load or traffic information of the RAT or the access frequency, mobility mode analytics information of the terminal device, and communication mode analytics information of the terminal device.

Figure 11:
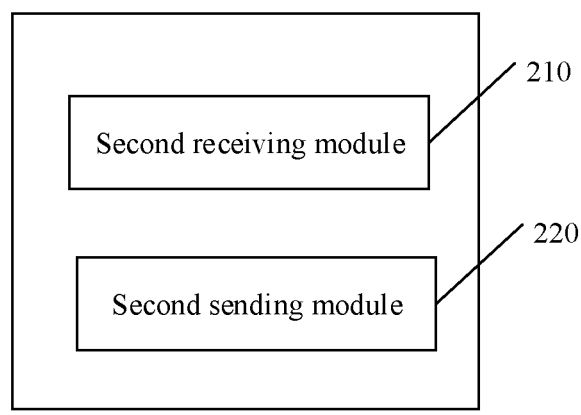
FIG. 11 is a schematic diagram of another communication apparatus according to an embodiment of this application.

FIG. 11 is a schematic diagram of another communication apparatus according to an embodiment of this application.

As shown in FIG. 11, the second communication apparatus may include a second receiving unit 210 and a second sending unit 220.

The second receiving unit 210 is configured to receive a first request message, where the first request message is used to request first analytics information, and the first analytics information includes at least one of the following information: RAT related information or access frequency related information, and service experience analytics information corresponding to a RAT or an access frequency; and the second sending unit 220 is configured to send a first response message, where the first response message includes the first analytics information.

Optionally, the RAT related information or the access frequency related information includes at least one of the following information: an identifier, a service type, a recommended RAT or a recommended access frequency, time information, and area information of a terminal device.

Optionally, the service experience analytics information corresponding to the RAT or the access frequency includes at least one of the following information: the identifier, the service type, the RAT or the access frequency, service experience for the service type, the time information, and the area information of the terminal device.

Optionally, the second receiving unit 210 is further configured to obtain network data and service data, where the network data includes at least one of the following information: the identifier, the time information, the area information, and the RAT or the access frequency of the terminal device, and the service data includes at least one of the following information: the identifier, the service type, and the service experience of the terminal device; and the data analytics network element determines the first analytics information based on the network data and the service data.

Optionally, the first request message includes the service type, and the first request message is used to request the first analytics information corresponding to the service type.

Optionally, the first request message includes the identifier of the terminal device, and the first request message is used to request the first analytics information corresponding to the identifier of the terminal device.

Optionally, the first response message further includes an applicable condition of the first analytics information, where the applicable condition includes at least one of the following information: the service type, a user type, a user identifier, the time information, and location information.

Figure 12:
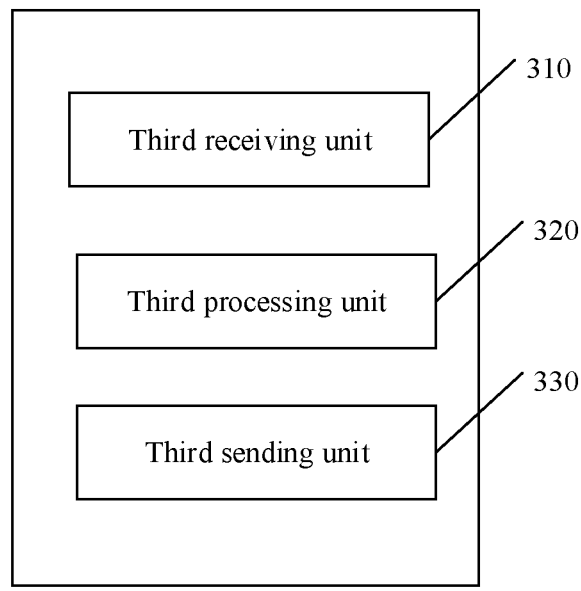
FIG. 12 is a schematic diagram of still another communication apparatus according to an embodiment of this application.

FIG. 12 is a schematic diagram of still another communication apparatus according to an embodiment of this application.

As shown in FIG. 12, the third communication apparatus may include a third receiving unit 310 and a third processing unit 320.

The third receiving unit 310 may be configured to obtain second analytics information from a data analytics network element, where the second analytics information includes at least one of the following information: RAT related information or access frequency related information, service experience analytics information corresponding to a RAT or an access frequency, and service behavior analytics information; and the third processing unit 320 may be configured to determine an energy saving policy of a network area based on the second analytics information.

Optionally, the RAT related information or the access frequency related information includes at least one of the following information: an identifier, a service type, a recommended RAT or a recommended access frequency, time information, and area information of a terminal device.

Optionally, the service experience analytics information corresponding to the RAT or the access frequency includes at least one of the following information: the identifier, the service type, the RAT or the access frequency, service experience for the service type, the time information, and the area information of the terminal device.

Optionally, that the third processing unit 320 determines an energy saving policy of a network area based on the second analytics information includes: The third processing unit 320 determines a method for enabling or disabling, power consumption control, or load transfer of an access network network element in the network area based on the second analytics information, where the method enables energy consumption of the network area to meet a preset condition, and/or enables the service experience corresponding to the service type to meet a preset condition.

Optionally, when the second analytics information includes the RAT related information or the access frequency related information, and the RAT related information or the access frequency related information includes the recommended RAT or the recommended access frequency for at least one service type, that the third processing unit 320 determines an energy saving policy of a network area based on the second analytics information includes: The third processing unit 320 determines a service type of the network area, where the service type of the network area refers to at least one service type that has been initiated or is to be initiated in the network area; the third processing unit 320 determines a user quantity or a user quantity proportion of the service type of the network area; and the third processing unit 320 determines the method for enabling or disabling, power consumption control, or load transfer of the access network network element in the network area based on a recommended RAT or a recommended access frequency corresponding to the service type of the network area and the user quantity or the user quantity proportion of the service type of the network area.

Optionally, when the second analytics information includes the RAT related information or the access frequency related information, and the RAT related information or the access frequency related information includes a recommended RAT or a recommended access frequency for a terminal device level, that the third processing unit 320 determines an energy saving policy of a network area based on the second analytics information includes: The third processing unit 320 determines a recommended RAT or a recommended access frequency corresponding to at least one terminal device in the network area; and the third processing unit 320 determines the method for enabling or disabling, power consumption control, or load transfer of the access network network element in the network area based on the recommended RAT or the recommended access frequency corresponding to the at least one terminal device in the network area.

Optionally, when the second analytics information includes the RAT related information or the access frequency related information, and the RAT related information or the access frequency related information includes a recommended RAT or a recommended access frequency for a terminal device-level service type, a method in which the third processing unit 320 determines an energy saving policy of a network area based on the second analytics information includes: The third processing unit 320 determines a service type that has been initiated or is to be initiated by the terminal device in the network area; the third processing unit 320 determines a recommended RAT or a recommended access frequency corresponding to the service type that has been initiated or is to be initiated by the terminal device; and the second network element determines the method for enabling or disabling, power consumption control, or load transfer of the access network network element based on the recommended RAT or the recommended access frequency corresponding to the service type that has been initiated or is to be initiated by the terminal device.

Optionally, when the second analytics information includes the service experience analytics information corresponding to the RAT or the access frequency, and the service experience analytics information corresponding to the RAT or the access frequency includes corresponding service experience for at least one service type in the RAT or the access frequency, a method in which the third processing unit 320 determines an energy saving policy of a network area based on the second analytics information includes: The third processing unit 320 determines the service type of the network area, where the service type of the network area refers to at least one service type that has been initiated or is to be initiated in the network area; for the service type of the network area, the third processing unit 320 determines the target RAT or the target access frequency in the service experience analytics information corresponding to the RAT or the access frequency, so that service experience corresponding to the service type of the network area in the target RAT or the target access frequency can meet a preset condition; the third processing unit 320 determines the user quantity or the user quantity proportion of the service type of the network area; and the third processing unit 320 determines the method for enabling or disabling, power consumption control, or load transfer of the access network network element based on the user quantity or the user quantity proportion of the service type of the network area and the target RAT or the target access frequency corresponding to the service type of the network area.

Optionally, when the second analytics information includes the service experience analytics information corresponding to the RAT or the access frequency, and the service experience analytics information corresponding to the RAT or the access frequency includes corresponding service experience for a terminal device-level service type in the RAT or the access frequency, a method in which the third processing unit 320 determines an energy saving policy of a network area based on the second analytics information includes: The third processing unit 320 determines a service type that has been initiated or is to be initiated by the terminal device in the network area; for the service type that has been initiated or is to be initiated by the terminal device, the third processing unit 320 determines the target RAT or the target access frequency in the service experience analytics information corresponding to the RAT or the access frequency, so that corresponding service experience for the service type that is in the target RAT or the target access frequency and that has been initiated or is to be initiated by the terminal device can meet the preset condition; and the third processing unit 320 determines the method for enabling or disabling, power consumption control, or load transfer of the access network network element based on the service type that has been initiated or is to be initiated by the terminal device and the target RAT or the target access frequency corresponding to the service type that has been initiated or is to be initiated by the single terminal device.

Optionally, the second analytics information further includes service behavior analytics information, and the service behavior analytics information includes service behavior analytics information of the terminal device that is aggregated in the network area; and that the third processing unit 320 determines a service type of the network area includes: The third processing unit 320 determines the service type of the network area based on the service behavior analytics information of the terminal device that is aggregated in the network area.

Optionally, the second analytics information further includes service behavior analytics information, and the service behavior analytics information includes terminal device-level service behavior analytics information; and that the third processing unit 320 determines a service type that has been initiated or is to be initiated by the terminal device in the network area includes: The third processing unit 320 determines, based on the terminal device-level service behavior analytics information, the service type that has been initiated or is to be initiated by the terminal device in the network area.

Optionally, the third receiving unit 310 is further configured to obtain an applicable condition of the second analytics information, where the applicable condition includes at least one of the following information: the service type, a user type, a user identifier, the time information, and the area information.

Optionally, the third communication apparatus may further include a third sending unit 330.

Optionally, when the third communication device is a core network element or a network management network element, the third sending unit 330 may be configured to send the energy saving policy of the network area to an access network element; or the third sending unit 330 may be configured to send the energy saving policy of the network area to a network management execution network element.

Optionally, the third sending unit 330 may be further configured to send an applicable condition of the energy saving policy of the network area to the access network element or the network management execution network element, where the applicable condition includes at least one of the following information: the service type, a user type, a user identifier, the time information, and the area information.

Optionally, when the third communication apparatus is an access network element, the third processing unit 320 performs the method for enabling or disabling, power consumption control, or load transfer of the access network network element based on the energy saving policy of the network area.

Optionally, that the third receiving unit 310 is configured to obtain second analytics information from a data analytics network element includes: The third sending unit 330 sends a second request message to the data analytics network element, where the second request message includes at least one piece of area information, and the second request message is used to request to obtain the second analytics information corresponding to the area information; and the third receiving unit 310 receives a second response message sent by the data analytics network element, where the second response message includes the second analytics information.

Optionally, that the third receiving unit 310 is configured to obtain second analytics information from a data analytics network element includes: The third sending unit 330 sends a second request message to the data analytics network element, where the second request message includes the service type, and the second request message is used to request to obtain the second analytics information corresponding to the service type; and the third receiving unit 310 receives a second response message sent by the data analytics network element, where the second response message includes the second analytics information.

Optionally, the service behavior analytics information includes the terminal device-level service behavior analytics information or the service behavior analytics information of the terminal device that is aggregated in the network area.

Optionally, the service behavior analytics information includes service behavior statistics information or service behavior prediction information.

Optionally, the service behavior analytics information includes at least one of the following information: the identifier, the time information, the area information, the service type, priority information of the service type, an occurrence probability of the service type, duration of the service type, the user quantity corresponding to the service type, and the user quantity proportion of the service type of the terminal device.

In embodiments of this application, the processing unit may be a processor, and the sending unit and the receiving unit may be separate units, or may be integrated into one unit, for example, integrated into a transceiver, a transceiver circuit, or a transceiver chip. This is not limited herein. The processing unit is configured to implement a signal processing operation of the core network element, the network management network element, or the access network element in the foregoing method embodiments. The receiving unit is configured to implement a signal receiving operation of the core network element, the network management network element, or the access network element in the foregoing method embodiments. The sending unit is configured to implement a signal sending operation of the core network element, the network management network element, or the access network element in the foregoing method embodiments.

Figure 13:
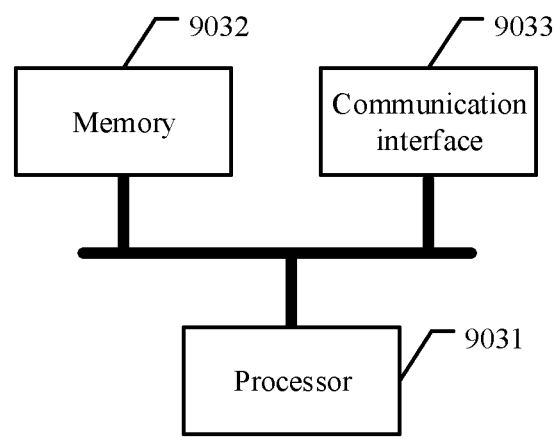
FIG. 13 is a schematic diagram of yet another communication apparatus according to an embodiment of this application.

FIG. 13 is a schematic diagram of yet another communication apparatus according to an embodiment of this application.

As shown in FIG. 13, the communication apparatus includes at least one processor 9031 and a communication interface 9033. The at least one processor 9031 is coupled to a memory, and is configured to execute instructions stored in the memory, to control the communication interface 9033 to transmit data.

Optionally, the communication apparatus further includes the memory 9032, configured to store the instructions.

It should be understood that the at least one processor 9031 and the memory 9032 may be combined into one processing apparatus, and the at least one processor 9031 is configured to execute program code stored in the memory 9032 to implement the foregoing function. During specific implementation, the memory 9032 may alternatively be integrated into the at least one processor 9031, or may be independent of the at least one processor 9031.

In a possible design, the communication apparatus may be the first network element in the foregoing method embodiments, or may be a chip configured to implement the function of the first network element in the foregoing method embodiments. Specifically, the communication apparatus may correspond to the first network element in the methods in embodiments of this application, and the communication apparatus may include units configured to perform the methods performed by the first network element in the methods in FIG. 5 to FIG. 7. In addition, the units in the communication apparatus and the foregoing other operations and/or functions are separately used to implement corresponding procedures of the methods in FIG. 5 to FIG. 7. It should be understood that, a specific process in which each unit performs the foregoing corresponding step has been described in detail in the foregoing method embodiments. For brevity, details are not described herein again.

In a possible design, the communication apparatus may be the second network element in the foregoing method embodiments, or may be a chip configured to implement the function of the second network element in the foregoing method embodiments. Specifically, the communication apparatus may correspond to the second network element in the methods in embodiments of this application, and the communication apparatus may include units configured to perform the methods performed by the second network element in the methods in FIG. 8 and FIG. 9. In addition, the units in the communication apparatus and the foregoing other operations and/or functions are separately used to implement corresponding procedures of the methods in FIG. 8 and FIG. 9. It should be understood that, a specific process in which each unit performs the foregoing corresponding step has been described in detail in the foregoing method embodiments. For brevity, details are not described herein again.

In a possible design, the communication apparatus may be the third network element in the foregoing method embodiments, or may be a chip configured to implement the function of the third network element in the foregoing method embodiments. Specifically, the communication apparatus may correspond to the third network element in the methods in embodiments of this application, and the communication apparatus may include units configured to perform the methods performed by the third network element in the methods in FIG. 5 to FIG. 7. In addition, the units in the communication apparatus and the foregoing other operations and/or functions are separately used to implement corresponding procedures of the methods in FIG. 5 to FIG. 7. It should be understood that, a specific process in which each unit performs the foregoing corresponding step has been described in detail in the foregoing method embodiments. For brevity, details are not described herein again.

In a possible design, the communication apparatus may be the fourth network element in the foregoing method embodiments, or may be a chip configured to implement the function of the fourth network element in the foregoing method embodiments. Specifically, the communication apparatus may correspond to the fourth network element in the methods in embodiments of this application, and the communication apparatus may include units configured to perform the methods performed by the fourth network element in the methods in FIG. 8 and FIG. 9. In addition, the units in the communication apparatus and the foregoing other operations and/or functions are separately used to implement corresponding procedures of the methods in FIG. 8 and FIG. 9. It should be understood that, a specific process in which each unit performs the foregoing corresponding step has been described in detail in the foregoing method embodiments. For brevity, details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments provided in this application, it should be understood that the disclosed system, apparatus, and method may be implemented in another manner. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in embodiments of this application may be integrated into one first processing unit, or each of the units may exist alone physically, or two or more units are integrated into one unit.

In embodiments of this application, the first processing unit, the second processing unit, the third processing unit, the first receiving unit, the second receiving unit, the third receiving unit, the first sending unit, the second sending unit, and the third sending unit are merely for ease of description, and sorting and a sequence of the processing unit, the receiving unit, and the sending unit are not limited.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A policy determining method, comprising:
obtaining, by a policy control function (PCF) network element, analytics information from a data analytics network element, wherein the analytics information comprises service experience analytics information corresponding to a radio access type (RAT) or an access frequency; and determining, by the PCF network element, an access information selection policy of a terminal device based on the analytics information, wherein the access information selection policy comprises a target RAT or a target access frequency corresponding to the terminal device.

2. The method according to claim 1, wherein the service experience analytics information comprises at least one of an identifier of the terminal device, a service type, the RAT or the access frequency, service experience for the service type, time information, or area information of the terminal device.

3. The method according to claim 1, wherein the determining the access information selection policy of the terminal device based on the analytics information comprises:

determining, by the PCF network element based on the analytics information, the target RAT or the target access frequency corresponding to the terminal device, wherein service experience for the service type of the terminal device in the target RAT or the target access frequency meets a preset condition.

4. The method according to claim 1, wherein the service experience analytics information comprises corresponding service experience for at least one service type in the RAT or the access frequency, wherein the determining the access information selection policy of the terminal device based on the analytics information comprises:

determining, by the PCF network element, a service type that has been initiated or is to be initiated by the terminal device; and for the service type that has been initiated or is to be initiated by the terminal device, determining, by the PCF network element, the target RAT or the target access frequency in the service experience analytics information corresponding to the RAT or the access frequency, wherein corresponding service experience for the service type that is in the target RAT or the target access frequency and that has been initiated or is to be initiated by the terminal device meets the preset condition.

5. The method according to claim 4, wherein the determining the service type that is to be initiated by the terminal device comprises:

obtaining, by the PCF network element, service behavior analytics information of the terminal device from the data analytics network element; and predicting, by the PCF network element based on the service behavior analytics information of the terminal device, the service type that is to be initiated by the terminal device.

6. The method according to claim 5, wherein the service behavior analytics information of the terminal device comprises service behavior statistics information of the terminal device or service behavior prediction information of the terminal device.

7. The method according to claim 1, wherein the obtaining the analytics information from the data analytics network element comprises:

sending, by the PCF network element, a first request message to the data analytics network element, wherein the first request message comprises the service type, and the first request message requests the analytics information corresponding to the service type; and receiving, by the PCF network element, a first response message from the data analytics network element, wherein the first response message comprises the analytics information corresponding to the service type.

8. The method according to claim 1, wherein the obtaining the analytics information from the data analytics network element comprises:

sending, by the PCF network element, a first request message to the data analytics network element, wherein the first request message comprises the identifier of the terminal device, and the first request message requests the analytics information corresponding to the terminal device; and receiving, by the PCF network element, a first response message from the data analytics network element, wherein the first response message comprises the analytics information corresponding to the terminal device.

9. The method according to claim 1, further comprising: obtaining, by the PCF network element, an applicable condition of the analytics information, wherein the applicable condition comprises at least one of the service type, a user type, a user identifier, the time information, or the area information.

10. The method according to claim 1, further comprising: sending, by the PCF network element, the access information selection policy of the terminal device to an access network element.

11. An apparatus, comprising:

at least one processor; and a memory coupled to the processor and storing computer instructions, which when executed by the at least one processor, cause the apparatus to:

obtain first analytics information from a data analytics network element, wherein the first analytics information comprises service experience analytics information corresponding to a radio access type (RAT) or an access frequency; and determine an access information selection policy of a terminal device based on the first analytics information, wherein the access information selection policy comprises a target RAT or a target access frequency corresponding to the terminal device.

12. The apparatus according to claim 11, wherein the service experience analytics information comprises at least one of an identifier of the terminal device, a service type, the RAT or the access frequency, service experience for the service type, time information, or area information of the terminal device.

13. The apparatus according to claim 11, wherein the computer instructions, which when executed by the at least one processor, further cause the apparatus to:

determine, based on the analytics information, the target RAT or the target access frequency corresponding to the terminal device, wherein service experience for the service type of the terminal device in the target RAT or the target access frequency meets a preset condition.

14. The apparatus according to claim 11, wherein the service experience analytics information comprises corresponding service experience for at least one service type in the RAT or the access frequency, wherein the computer instructions, which when executed by the at least one processor, further cause the apparatus to:

determine a service type that has been initiated or is to be initiated by the terminal device; and for the service type that has been initiated or is to be initiated by the terminal device, determine the target RAT or the target access frequency in the service experience analytics information corresponding to the RAT or the access frequency, wherein corresponding service experience for the service type that is in the target RAT or the target access frequency and that has been initiated or is to be initiated by the terminal device meets the preset condition.

15. The apparatus according to claim 14, wherein the computer instructions, which when executed by the at least one processor, further cause the apparatus to:
   obtain service behavior analytics information of the terminal device from the data analytics network element; and
   predict, based on the service behavior analytics information of the terminal device, the service type that is to be initiated by the terminal device.

16. The apparatus according to claim 15, wherein the service behavior analytics information of the terminal device comprises service behavior statistics information of the terminal device or service behavior prediction information of the terminal device.

17. The apparatus according to claim 11, wherein the computer instructions, which when executed by the at least one processor, further cause the apparatus to:
   send a first request message to the data analytics network element, wherein the first request message comprises the service type, and the first request message requests the first analytics information corresponding to the service type; and
   receive a first response message from the data analytics network element, wherein the first response message comprises the analytics information corresponding to the service type.

18. The apparatus according to claim 11, wherein the computer instructions, which when executed by the at least one processor, further cause the apparatus to:
   send a first request message to the data analytics network element, wherein the first request message comprises the identifier of the terminal device, and the first request message requests the analytics information corresponding to the terminal device; and
   receive a first response message from the data analytics network element, wherein the first response message comprises the analytics information corresponding to the terminal device.

19. The apparatus according to claim 11, wherein the computer instructions, which when executed by the at least one processor, further cause the apparatus to:
   obtain an applicable condition of the analytics information, wherein the applicable condition comprises at least one of the service type, a user type, a user identifier, the time information, or the area information.

20. The apparatus according to claim 11, wherein the apparatus is a policy control function (PCF) network element, wherein the computer instructions, which when executed by the at least one processor, further cause the apparatus to:
   send the access information selection policy of the terminal device to an access network element.

* * * * *